United States Patent
Koorapaty et al.

(10) Patent No.: US 9,820,292 B2
(45) Date of Patent: Nov. 14, 2017

(54) NETWORK NODE, WIRELESS DEVICE AND METHOD PERFORMED THEREIN

(71) Applicant: TELEFONAKTIEBOLAGET L M ERICSSON (PUBL), Stockholm (SE)

(72) Inventors: Havish Koorapaty, Saratoga, CA (US); Sorour Falahati, Stockholm (SE); Daniel Larsson, Vallentuna (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 14/763,285

(22) PCT Filed: Mar. 19, 2015

(86) PCT No.: PCT/SE2015/050324
§ 371 (c)(1),
(2) Date: Jul. 24, 2015

(87) PCT Pub. No.: WO2015/142274
PCT Pub. Date: Sep. 24, 2015

(65) Prior Publication Data
US 2016/0255641 A1    Sep. 1, 2016

Related U.S. Application Data

(60) Provisional application No. 61/955,689, filed on Mar. 19, 2014.

(51) Int. Cl.
*H04W 72/00* (2009.01)
*H04W 72/04* (2009.01)
(Continued)

(52) U.S. Cl.
CPC ....... *H04W 72/1205* (2013.01); *H04L 5/0048* (2013.01); *H04W 52/0216* (2013.01);
(Continued)

(58) Field of Classification Search
CPC ............... H04L 5/0048; H04L 5/0053; H04W 72/0413; H04W 72/04
(Continued)

(56) References Cited

U.S. PATENT DOCUMENTS 9,509,469 B2 * 11/2016 Cheng ................... H04L 5/0048
2010/0232373 A1 * 9/2010 Nory .................. H04W 72/1289
370/329

(Continued)

OTHER PUBLICATIONS

Qualcomm Incorporated: "Small Cell On/Off Time Reduction," 3GPP TSG RAN WG1 Meeting #76, Feb. 10-14, 2014, Prague, Czech Republic, R1-140452, 5 pages.
(Continued)

*Primary Examiner* — Edan Orgad
*Assistant Examiner* — Emmanuel Maglo
(74) *Attorney, Agent, or Firm* — Rothwell, Figg, Ernst & Manbeck, P.C.

(57) ABSTRACT

Embodiments herein relate to a method performed by a network node for enabling the network node to communicate with a set of one or more wireless communication devices (WCDs) and to a method performed by a WCD for communicating with the network node. The network node selects a subframe for carrying data to at least one of the WCDs included in the set of one or more WCDs. The network node determines whether an activity indicator specific to the set of one or more WCDs should be transmitted to the set of one or more WCDs; and, in response to determining that the activity indicator specific to the set of WCDs should be transmitted, the network node transmits the activity indicator in the selected subframe and/or in one or more subframes that precede the selected subframe data. The network node further transmits the data to the at least one of the WCDs included in the set of one or more WCDs in the selected subframe.

26 Claims, 16 Drawing Sheets

(51) Int. Cl.
  *H04L 5/00* (2006.01)
  *H04W 72/12* (2009.01)
  *H04W 52/02* (2009.01)
  *H04W 48/16* (2009.01)
(52) U.S. Cl.
  CPC ... *H04W 52/0229* (2013.01); *H04W 72/0446* (2013.01); *H04W 48/16* (2013.01); *H04W 72/005* (2013.01); *Y02B 60/50* (2013.01)
(58) Field of Classification Search
  USPC .......................................... 370/329; 455/450
  See application file for complete search history.

(56) References Cited

U.S. PATENT DOCUMENTS

| | | | | |
|---|---|---|---|---|
| 2012/0113962 | A1* | 5/2012 | Jen | H04L 1/16 370/336 |
| 2012/0307772 | A1* | 12/2012 | Kwon | H04L 5/0007 370/329 |
| 2013/0021954 | A1* | 1/2013 | Montojo | H04L 5/14 370/295 |
| 2013/0083681 | A1* | 4/2013 | Ebrahimi Tazeh Mahalleh | H04L 5/0057 370/252 |
| 2013/0094419 | A1* | 4/2013 | Sumasu | H04J 11/005 370/311 |
| 2013/0178220 | A1* | 7/2013 | Lee | H04L 5/0007 455/450 |
| 2013/0301561 | A1* | 11/2013 | Sartori | H04W 72/04 370/329 |
| 2014/0119317 | A1* | 5/2014 | Kim | H04L 5/0048 370/329 |
| 2014/0133429 | A1* | 5/2014 | Chun | H04L 5/005 370/329 |
| 2014/0334320 | A1* | 11/2014 | Liu | H04W 52/242 370/252 |
| 2014/0348048 | A1* | 11/2014 | Fei | H04L 5/0055 370/311 |
| 2015/0222399 | A1* | 8/2015 | Cheng | H04L 5/0035 370/329 |
| 2015/0304995 | A1* | 10/2015 | Yi | H04L 5/001 370/329 |
| 2015/0341152 | A1* | 11/2015 | Kim | H04W 24/00 370/329 |
| 2015/0351091 | A1* | 12/2015 | Yang | H04B 7/2643 370/329 |
| 2016/0295500 | A1* | 10/2016 | Liu | H04W 48/16 |
| 2016/0381666 | A1* | 12/2016 | Kim | H04W 72/042 370/329 |

OTHER PUBLICATIONS

Ericsson: "On Small Cell On/Off and the New L1 Procedure," 3GPP TSG RAN WG1 Meeting #76, Prague, Czech Republic, Feb. 10-14, 2014, Prague, Czech Republic, RI-140758, 5 pages.

Ericsson: "On Transition Time Reduction for Small Cell On/Off," 3GPP TSG RAN WG1 Meeting #76 bis, Shenzhen, China, Feb. 4, 2014-Mar. 31, 2014, RI-141640, 6 pages.

International Search Report, PCT/SE2015/050324, Filing date: Mar. 19, 2015, Applicant: Telefonaktiebolaget L M Ericsson (Publ), dated Jun. 18, 2015, 3 pages.

Written Opinion issued in International application No. PCT/SE2015/050324, dated Jun. 18, 2015, 9 pages.

* cited by examiner

NETWORK NODE, WIRELESS DEVICE AND METHOD PERFORMED THEREIN

CROSS-REFERENCE TO RELATED APPLICATION

This application is a 35 U.S.C. §371 National Phase Entry Application from PCT/SE2015/050324, filed Mar. 19, 2015, and designating the United States, and also claims the benefit of U.S. Provisional Application No. 61/955,689, filed Mar. 19, 2014. The disclosures of both applications are incorporated herein in their entirety by reference.

TECHNICAL FIELD

This disclosure relates to a network node, a wireless communication device, and methods performed therein for enabling the network node to communicate with one or more wireless communication devices.

BACKGROUND

While the present application is applicable to any wireless communications technology, the main ideas are explained in the context of the Third Generation Partnership Project (3GPP) Long Term Evolution (LTE) technology.

Frame Structure and Reference Signals

3GPP LTE technology is a mobile broadband wireless communication technology in which transmissions from network nodes such as base stations, referred to as eNBs below, to Wireless Communication Devices (WCD) such as mobile stations, also referred to as user equipment (UE), are sent using Orthogonal Frequency Division Multiplexing (OFDM). OFDM splits the signal into multiple parallel sub-carriers in frequency. A basic unit of transmission in LTE is a Resource Block (RB) which in its most common configuration comprises twelve subcarriers and seven OFDM symbols, i.e. one slot. A unit of one subcarrier and one OFDM symbol is referred to as a Resource Element (RE). Thus, an RB comprises 84 REs. An LTE radio subframe comprises two slots in time and multiple resource blocks in frequency with a number of RBs determining the bandwidth of the system. Furthermore, two RBs in a subframe that are adjacent in time are denoted an RB pair. Currently, LTE supports standard bandwidth sizes of 6, 15, 25, 50, 75 and 100 RB pairs.

In the time domain, LTE downlink transmissions over a radio channel are organized into radio frames of 10 ms, each radio frame comprising ten equally-sized subframes of length Tsubframe=1 ms.

The signal transmitted by the eNB in a downlink (DL), i.e. a link carrying transmissions from the eNB to the WCD, subframe may be transmitted from multiple antennas and the signal may be received at a WCD that has multiple antennas. The radio channel distorts the transmitted signals from the multiple antennas or antenna ports. In order to demodulate any transmissions on the downlink, a WCD relies on Reference Symbols or Signals (RSs) that are transmitted on the downlink. These RS s and their position in the time-frequency grid are known to the WCD and hence can be used to synchronize the WCD to the downlink signal and to determine channel estimates by measuring the effect of the radio channel on these RSs. In Rel-11 and prior releases of LTE, there are multiple types of RSs. A Primary Synchronization Signal (PSS) and a Secondary Synchronization Signal (SSS) are used for cell search and coarse time and frequency synchronization. Common Reference Symbols (CRS) are used for channel estimation during demodulation of control and data messages in addition to synchronization. The CRSs occur once every subframe. The Channel State Information—Reference Symbols (CSI-RS) are also used for channel state feedback related to the use of transmission modes that enable WCD-specific antenna precoding. These transmission modes use WCD-specific Demodulation—Reference Symbols (DM-RS) at the time of transmission of data with the precoding at the eNB performed based on the feedback received from and measured by the WCD on the CSI-RSs.

The PSS and SSS define a cell ID of a cell. The SSS can take 168 different values representing different cell ID groups. The PSS can take three different values that determine the cell ID within a group. Thus there are a total of 504 cell IDs. The PSS are Zadoff-Chu sequences of length 63 which along with 5 zeros appended on each edge of the Zadoff-Chu sequences occupy the 73 subcarriers in the central 6 RBs. The SSS are two m-sequences of length 31 that occupy alternate REs and are appended with 5 zeros on each edge of the m-sequences and located in the central 6 RBs as is the case for the PSS. The PSS and SSS sequences occur in subframes 0 and 5. The PSS sequence is the same in both subframe 0 and 5 while the SSS sequences differ between the subframes. The SSS sequence transmitted in subframe 0 is referred to as SSS1 while the SSS sequence transmitted in subframe 5 is referred to as SSS2. The SSS2 swaps the two length-31 m-sequences transmitted as part of the sequence SSS1 in subframe 0.

Dense deployments of small cells, e.g., cells served by low power base stations, are attractive to increase system capacity. However, dense deployments typically have fewer WCDs connected to each cell and lower resource utilization with higher rates provided when the cells are used. Reference signal structures that are developed for regular deployments with existing systems such as 3GPP LTE may have too high a density so that there is a lot of unnecessary interference created when deployments become dense. Reference signals may be transmitted even when there is no data being sent to WCDs.

In order to tackle this problem of unnecessary interference, solutions to turn small cells "off" when they are not being used are being considered, where "off" does not mean powered down, but rather not transmitting any data or merely transmitting small amounts of information infrequently, and "on" means a cell that schedules data to a WCD either in general or in the specific occasion when the data is actually scheduled. By turning off the base station in this way interference in neighboring cells may be reduced and the throughput may be increased in the wireless communication network. However, to ensure that cells can be ready to deliver data to and receive data from WCDs with minimal delay, it is necessary for WCDs to make some essential measurements on cells even when the cells are in an off mode. In order to facilitate this, a set of reference signals that are sent with much lower density in time have been discussed in 3GPP. Such signals are referred to as discovery signals and procedures associated with them are referred to as discovery procedures.

Discovery Signals

In "small cell on/off" scenarios in which an eNB can be "off", e.g., not transmitting any data, for long periods of time, a discovery signal might be needed in order to assist the WCD with the measurements. The discovery signal needs to support the properties required for enabling Radio Resource Management (RRM) measurements, Radio Link Management (RLM) related procedures and coarse time/ frequency synchronization. In order to make the measurements possible, the eNB has to wake up periodically, i.e. transition from "off" to "on", e.g. once every 80 ms, or 160 ms, etc, and send the discovery signal so that it can be used by the WCD for mobility related operations such as cell identification, RLM and RRM measurements. Hence, the discovery signals are transmitted periodically indicating that the eNB exists.

In order to receive data on the downlink, WCDs need to be able to recognize when the small cell is on and when it is off. The highest gains are achieved when the transition time between the cell being on and off is as fast as possible. A problem that needs to be solved is to enable a sufficiently fast transition time while allowing the WCD to reliably detect when cells are on and off.

Existing solutions for signaling whether a node is active or not rely on some form of a preamble, e.g. in WiFi, some form of signaling from another carrier, e.g., activation/deactivation of a Secondary Cell (SCell) in LTE, or some form of a longer time scale cell search and discovery mechanism.

The problem with the general cell search and discovery mechanisms is that they take time, typically many tens of milliseconds, which is too slow to be useful as a fast dynamic indication of node activity, or cell activity, with fast transition times between on and off states or modes. This results in a reduced performance of the wireless communication network.

SUMMARY

An object of embodiments herein is to provide a mechanism to improve the performance of the wireless communications network. A further object of embodiments herein is to improve the performance of the wireless communications network by enabling a reduction of interference from a cell to neighboring cells thereby increasing the throughput in the wireless communications network. Yet another object is to provide a fast dynamic mechanism for indication of node or cell activity in a synchronously operated wireless communications network.

The objects are achieved by providing a method performed by a network node for enabling the network node to communicate with a set of one or more wireless communication devices, WCDs. The network node selects a subframe for carrying data to at least one of the WCDs included in the set of one or more WCDs. The network node determines whether an activity indicator specific to the set of one or more WCDs should be transmitted to the set of one or more WCDs. In response to determining that the activity indicator specific to the set of one or more WCDs should be transmitted, the network node transmits the activity indicator in the selected subframe and/or in one or more subframes that precede the selected subframe. The network node also transmits the data, to the at least one of the WCDs included in the set of one or more WCDs, in the selected subframe.

The objects are further achieved by providing a method performed by a Wireless Communication Device, WCD, for communicating with a network node. The WCD is included in a set of one or more WCDs being served by the network node. The WCD determines whether an activity indicator, specific to the set of one or more WCDs, from the network node is detected in a first subframe. The activity indicator indicates that the network node has data to at least one of the WCDs included in the set of one or more WCDs. In response to the activity indicator being detected in the first subframe, the WCD attempts to receive data from the network node in one or more of: i) the first subframe and ii) a subsequent subframe that follows the first subframe.

In addition, the objects are achieved by providing a network node for communicating with a set of one or more WCDs. The network node is configured to select a subframe for carrying data to at least one of the WCDs included in the set of one or more WCDs. Furthermore, the network node is configured to determine whether an activity indicator specific to the set of one or more WCDs should be transmitted to the set of one or more WCDs. That being the case, the network node is configured to transmit the activity indicator in the selected subframe and/or in one or more subframes that precede the selected subframe. Furthermore, the network node is configured to transmit the data, to the at least one of the WCDs included in the set of one or more WCDs, in the selected subframe.

Additionally, the objects are achieved by providing a Wireless Communication Device, WCD, for communicating with a network node. The WCD is included in a set of one or more WCDs being served by the network node. The WCD is configured to determine whether an activity indicator, specific to the set of one or more WCDs, from the network node is detected in a first subframe. The activity indicator indicates that the network node has data to at least one of the WCDs included in the set of one or more WCDs. In response to the activity indicator being detected in the first subframe, the WCD is configured to attempt to receive data from the network node in one or more of: i) the first subframe and ii) a subsequent subframe that follows the first subframe.

Embodiments described herein achieve the objects mentioned above by enabling a network node to use an activity indicator for indicating that the network node has data to at least one of the WCDs included in a set of one or more WCDs, whereby the network node is enabled to go into an off mode where the network node may refrain from transmitting signals needed by WCDs for detecting existence of the network node whenever there is no data to transmit to any WCD served by the network node and to transition into an on mode, or active mode, as soon as there is data to be transmitted to any WCD served by the network node. In this way fast transitions between on and off states or modes are enabled, which means that the time during which the network node may reside in the off mode is increased compared to if a slower mechanism, e.g. relying on cell search or discovery signals, would be used. Thus, according to the embodiments disclosed herein the network node first transmits the activity indicator when having data to transmit to a WCD that needs to detect existence of the network node before receiving the data. This results in an efficient system leading to an improved performance where interference may be reduced and throughput increased in the wireless communication network when the time during which the network node may reside in the off mode is increased.

The embodiments presented herein have the advantage that they enable turning a cell off and on for a group of UEs or WCDs very rapidly thus enhancing performance in dense deployments. A further advantage is that they allow rapid cell on/off transitions while minimizing signaling overhead. Yet another advantage is that they provide flexibility in optimizing the number of wasted subframes used in providing an activity indication depending on the deployment scenario and specific on/off history of the cell. Furthermore, they provide a frame based system such as LTE with an on/off feature to be used in unlicensed bands with listen-before-talk requirements.

DETAILED DESCRIPTION

Terminology

Figure 1:
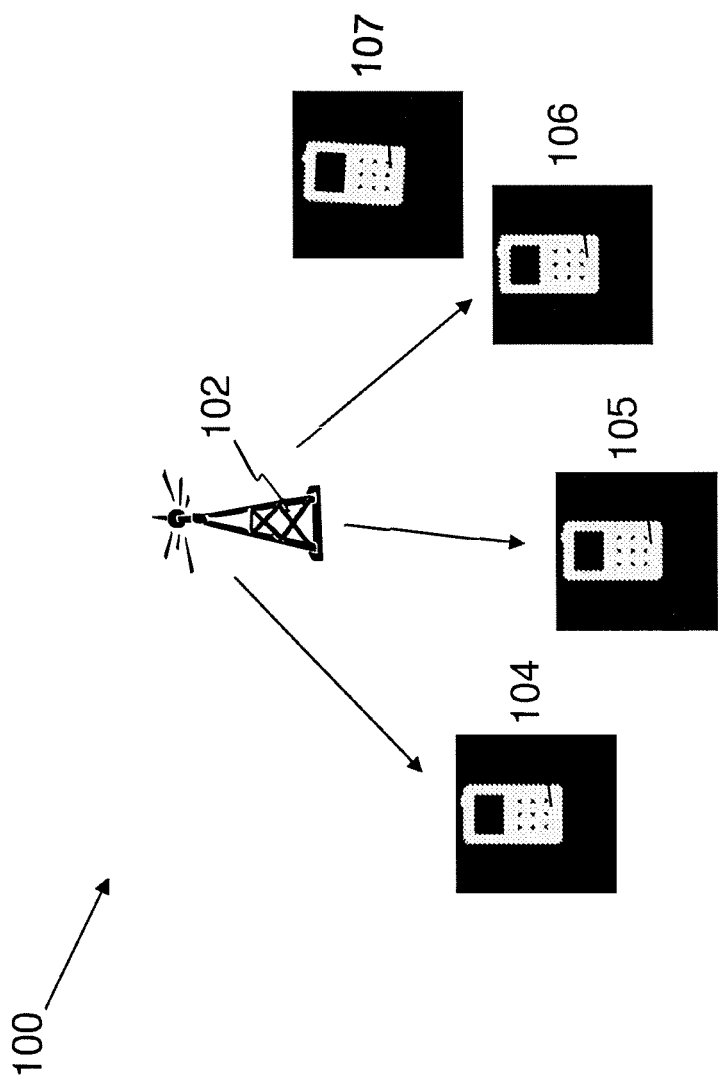
FIG. 1 illustrates a system according to embodiments that include a network node and a set of wireless communication devices, WCDs.

The following commonly used terminologies are used in the embodiments disclosed herein and are elaborated below:

Network node: corresponds to any type of radio network node or any network node, which communicates with a wireless communication device, e.g., a UE, and/or with another network node. Examples of network nodes are Node B, Base Station (BS), Multi-Standard Radio (MSR) radio node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS), core network node, e.g. Mobile Switching Center (MSC), Mobility Management Entity (MME) etc, Operation and Maintenance (O&M), Operation Support System (OSS), Self-Organizing Network (SON), positioning node, e.g. Enhanced Serving Mobile Location Center (E-SMLC), Minimization of Drive Test (MDT) etc.

Wireless communication device: this refers to any type of user equipment that can communicate with a network node and/or with another WCD in a wireless communication system, e.g. a cellular or mobile communication system. Examples of WCDs are target devices, Device to Device (D2D) enabled devices, machine type WCDs or WCDs capable of Machine to Machine (M2M) communication, PDAs, tablets, mobile terminals, smart phones, laptop embedded equipment (LEE), laptop mounted equipment (LME), USB dongles etc.

Note that although terminology from 3GPP LTE has been used in this disclosure, this should not be seen as limiting the scope of the invention to only the aforementioned system. Other wireless systems, including Wideband Code Division Multiple Access (WCDMA), High Speed Packet Access (HSPA), Universal Terrestrial Radio Access (UTRA), Global System for Mobile communications (GSM) network, GSM/Enhanced Data Rate for GSM Evolution (EDGE) Radio Access Network (GERAN), Ultra-Mobile Broadband (UMB), network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Wireless Local Area Network (WLAN), Worldwide Interoperability for Microwave Access (WiMax), 5G system or any cellular network or system may also benefit from exploiting the ideas covered within this disclosure.

Also note that terminology such as eNodeB and WCD should be considered non-limiting and does in particular not imply a certain hierarchical relation between the two; in general "eNodeB" could be considered as device 1 and "WCD" device 2, and these two devices communicate with each other over some radio channel. Herein, focus is also on wireless transmissions in the downlink, but embodiments are equally applicable for wireless transmissions in the uplink.

The embodiments are described with main emphasis on single carrier operation of the WCD. However, the embodiments are applicable for multi-carrier or carrier aggregation operation of the WCD. Therefore the embodiments can be carried out independently for each cell on each carrier frequency supported by the network node.

As stated above the problem with the general cell search and discovery mechanisms is that they are too slow to be useful as a fast dynamic indication of node activity with fast transition times between on and off states or modes, as these mechanisms take many tens of milliseconds to transition between two states or modes. The use of an SCell activation/deactivation mechanism is faster but is still not fast enough to reap the highest gains with small cell on/off. A preamble type mechanism in WiFi can be very fast, but operates asynchronously and does not apply to a synchronous system. Furthermore, it may increase power consumption of the WCD since it operates asynchronously. Another aspect is that the WiFi system essentially indicates activity but simultaneously also typically limits any possible data transmissions to data transmissions to a single WCD.

FIG. 1 shows a schematic overview depicting a wireless communication network 100 according to embodiments herein.

In the wireless communication network 100, a Wireless Communication Device 104, also known as a mobile station, a User Equipment (UE) and/or a wireless terminal, communicates e.g. via a Radio Access Network (RAN) to one or more core networks (CN) (not shown).

The wireless communication network 100 covers a geographical area which may be divided into cell areas, e.g. a cell being served by a network node 102. The network node 102 may also be referred to as a radio base station and e.g. a NodeB, an evolved Node B (eNB, eNode B), a base transceiver station, Access Point Base Station, base station router, or any other network unit capable of communicating with a WCD within the cell served by the network node 102 depending e.g. on the radio access technology and terminology used. The network node 102 may serve one or more cells.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but be using different frequency bands. Each cell is identified by an identity within the local radio area, which is broadcast in the cell. Another identity identifying the cell uniquely in the whole wireless communication network 100 is also broadcasted in the cell. The network node 102 communicates over a radio interface operating on radio frequencies with the WCD 104 within range of the network node 102. The WCD 104 transmits data over the radio interface to the network node 102 in Uplink (UL) transmissions and the network node 102 transmits data over a radio interface to the WCD 104 in Downlink (DL) transmissions.

The WCD 104 may be a first WCD of a set of WCDs, also referred to as a first set of WCDs. The set of WCDs may comprise one or more WCDs. E.g., the WCD 104 may be comprised in a set of WCDs further comprising a second WCD 105 and a third WCD 106. Additionally, a fourth WCD 107 may be comprised in a second set of one or more WCDs.

Embodiments herein disclose actions for the network node 102 to indicate activity e.g. to the WCD 104 or to the set of WCDs, 104-106 when the network node 102 goes from an off-state to an on-state with respect to the WCD 104 or to the set of WCDs, 104-106. The network node 102 selects a subframe for carrying data to the WCD 104 included in the set of WCDs. The network node 102 transmits, in response to determining that an activity indicator specific to the set of WCDs should be transmitted, the activity indicator in the selected subframe and/or in one or more subframes that precede the selected subframe. Precede means herein that the one or more subframes are within a range of subframes e.g. 1-5 subframes before the selected subframe. The WCD 104 detects the activity indicator in the selected subframe and/or in one or more subframes that precede the selected subframe. In response to detecting the activity indicator, the WCD 104 attempts to receive data from the network node (102) in the selected subframe and/or in one or more subframes that precede the selected subframe. In other words, the WCD 104 attempts to receive data in a first subframe carrying the activity indicator and/or a subsequent subframe that follows the first subframe. Subsequent means herein within a range of subframes e.g. 1-5 subframes after the first subframe.

The network node 102 further transmits the data, to the WCD 104 included in the set of one or more WCDs 104-106, in the selected subframe.

The network node 102 further transmits the data, to the WCD 104 included in the set of one or more WCDs 104-106, in the selected subframe.

As mentioned above, two sets of WCDs are illustrated in FIG. 1, namely the first set comprising WCDs 104, 105 and 106 and the second set comprising WCD 107. Each of the sets have an activity indicator specific to the respective set of WCDs to listen for from the network node 102. A WCD needs to know that the network node 102 is active before it can receive data from the network node 102. If too long time has elapsed since the WCD detected the activity indicator sent in conjunction with a previous data transmission to any WCD in the set that includes the WCD, the activity indicator needs to be sent by the network node 102 and detected by the WCD before the WCD can receive data from the network node 102. If the time that has elapsed is not too long, the WCD can receive data from the network node 102 without first detecting the activity indicator, which therefore need not be sent, because the WCD already knows that the network node 102 is up and running, so it can listen to the network node 102 for transmissions indicated e.g. by downlink assignments in Downlink Control information (DCI). By having different activity indicators for different sets of WCDs the network node 102 can be active to one of the sets but not to the other, or the network node 102 may be active to both, or to none. Data can be transmitted to WCDs in both sets in the same subframe simultaneously, or in different subframes. Hence, the WCDs in the sets use their respective activity indicators for knowing when to receive data. As the transition time between the cell being on and off is fast the performance of the wireless communication network is improved, for example in that the delay in delivering data to the WCDs is reduced as compared to what would be the case if a slower mechanism, discussed above, would be used.

Figure 2:
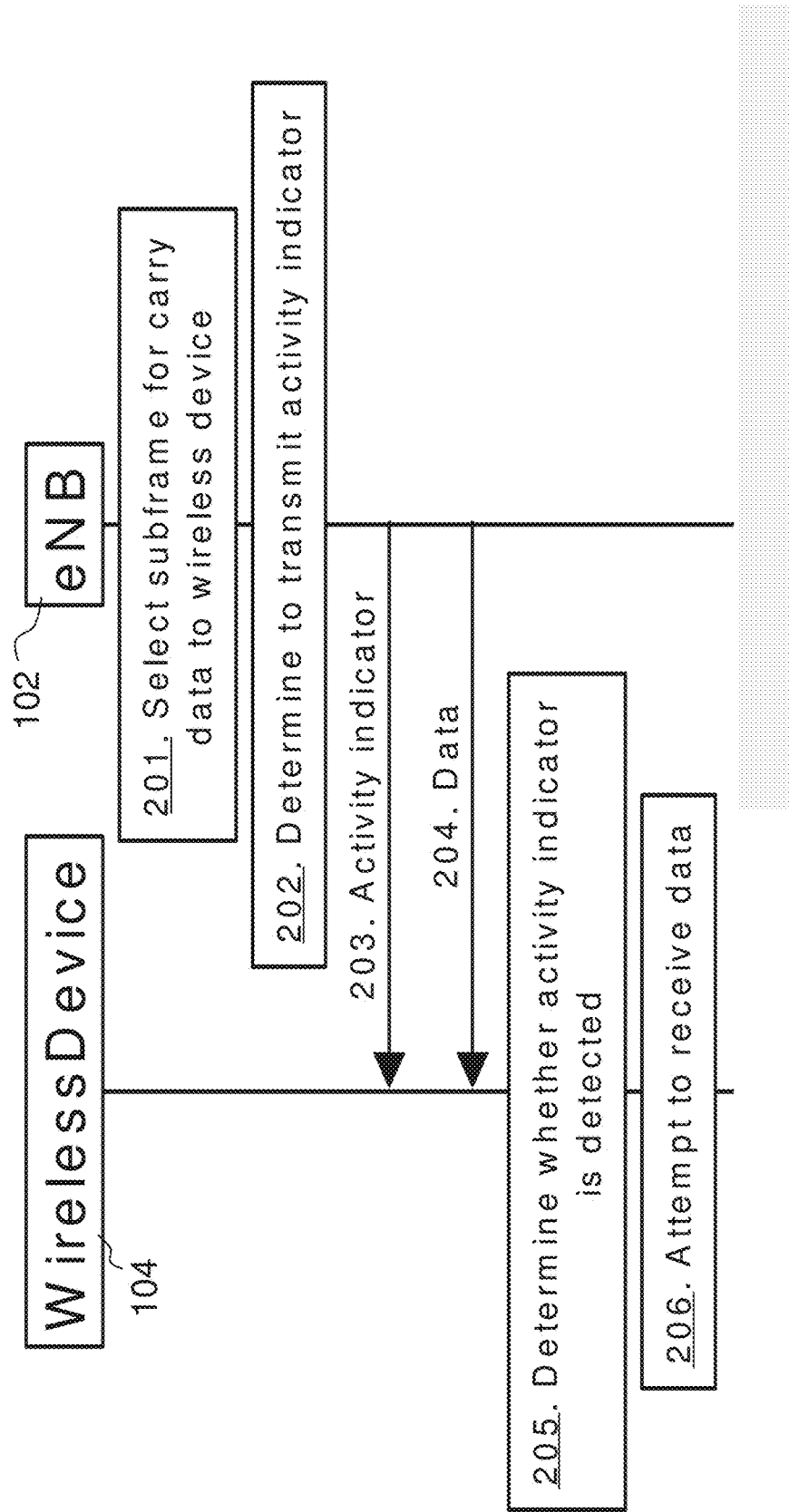
FIG. 2 illustrates a combined flowchart and signal scheme according to embodiments herein.

FIG. 2 is a combined flowchart and signaling scheme according to embodiments herein.

Action 201. The network node 102, exemplified as an eNB in the figure, selects a subframe to carry data to the WCD 104.

Action 202. The network node determines whether to transmit the activity indicator to the set of WCDs comprising the WCD 104. For example, the network node 102 may determine when data was last transmitted to the set of WCDs and if the time interval elapsed since data was last transmitted exceeds a threshold value, the network node 102 may determine that the activity indicator should be transmitted. Alternatively or additionally, the network node 102 may determine when the activity indicator specific to the set of WCDs was last transmitted and if the time interval elapsed since the activity indicator was last transmitted exceeds a threshold value, the network node 102 may determine that the activity indicator should be transmitted.

Action 203. If the outcome in action 202 was that the activity indicator should be transmitted, the network node 102 transmits the activity indicator in one or more subframes that precede the selected subframe and/or in the selected subframe.

Action 204. The network node 102 further transmits the data, to the WCD 104 included in the set of one or more WCDs 104-106, in the selected subframe. Thus, the network node 102 may transmit the activity indicator simultaneously with the data or before the data.

Action 205. The WCD 104 determines whether the activity indicator specific to the set of one or more WCDs is detected in a first subframe.

Action 206. The WCD 104 attempts, in response to the activity indicator being detected in the first subframe, to receive data from the network node 102 in the first subframe, and/or a subsequent subframe that follows the first subframe.

Figure 3:
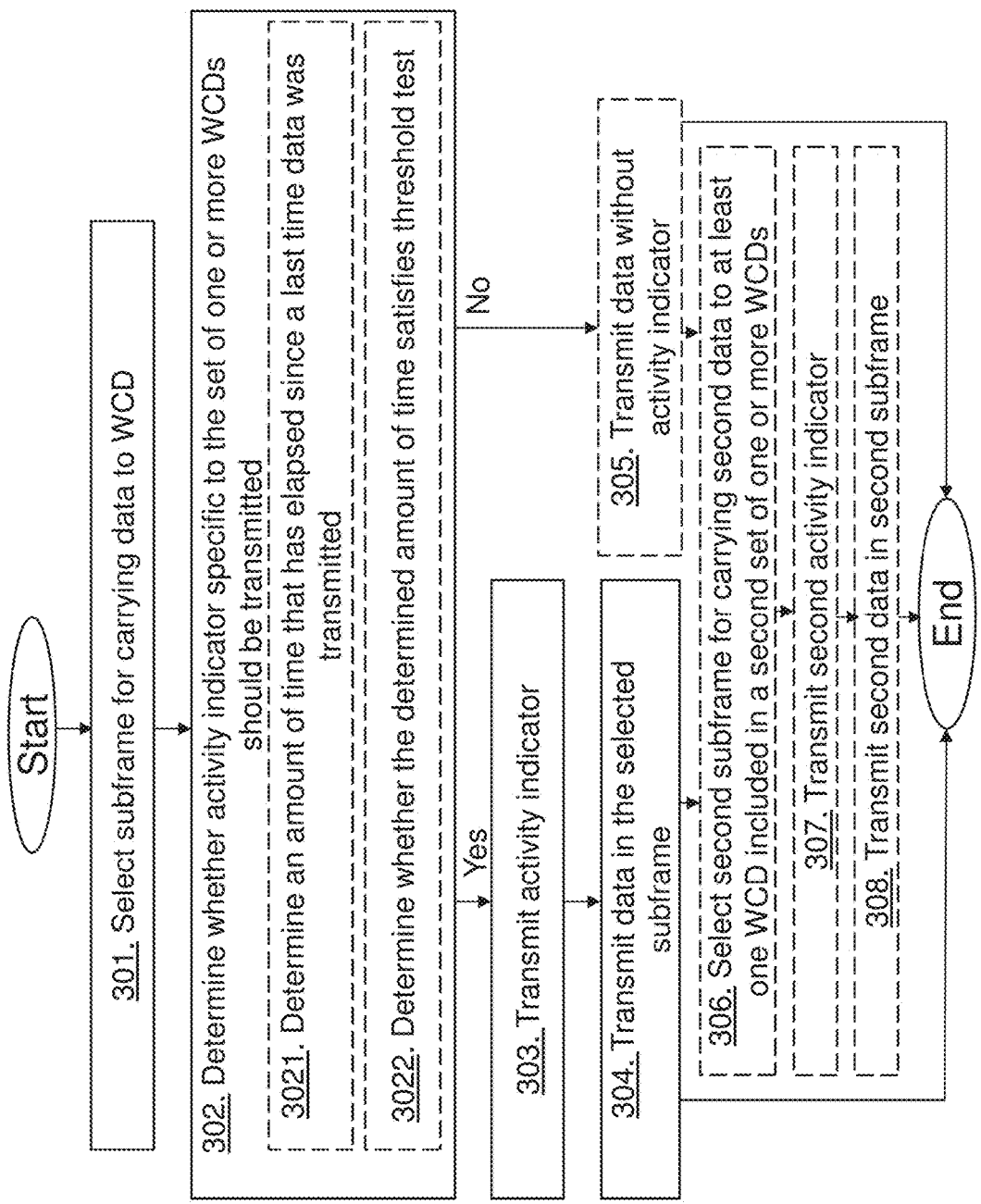
FIG. 3 illustrates a flowchart depicting a method performed by a network node according to embodiments herein.

The method actions in the network node 102, for enabling the network node 102 to communicate with a set of one or more WCDs according to some embodiments will now be described with reference to a flowchart depicted in FIG. 3. The actions do not have to be taken in the order stated below, but may be taken in any suitable order. Actions performed in some, but not necessarily all embodiments are marked with dashed boxes.

Action 301. The network node 102 selects a subframe for carrying data to at least one of the WCDs, e.g. the first WCD 104, included in the set of one or more WCDs, e.g. the first WCD 104, second WCD 105, and third WCD 106.

Action 302. The network node 102 determines whether an activity indicator specific to the set of one or more WCDs should be transmitted to the set of one or more WCDs 104-106. The network node 102 may e.g. determine whether the transmission of data to the at least one of the WCDs 104 is a first transmission of data to any WCD included in the set of one or more WCDs 104-106 within a time interval spanning a number of subframes including the selected subframe. The network node 102 may then transmit the activity indicator in the one or more subframes that precede the selected subframe and that are within the time interval. In some embodiments, the network node 102 may determine whether the transmission of data to the at least one of the WCDs is the first transmission of data to any WCD included in the set of one or more WCDs 104-106 within the time interval by determining, action 3021, an amount of time that has elapsed since a last time data was transmitted to any WCD included in the set of one or more WCDs 104-106. The network node 102 may then determine, action 3022, whether the determined amount of time satisfies a threshold test, and in that case, i.e. when the threshold test is satisfied, the network node 102 determines that the activity indicator specific to the set of one or more WCDs 104-106 should be transmitted. The threshold test is satisfied when the amount of time that has elapsed since the last time data was transmitted to any WCD included in the set of one or more WCDs 104-106 is longer/larger than the threshold amount, i.e. the time interval. That is, when the amount of time that has elapsed since the last time data was transmitted is longer than the time interval, the activity indicator should be transmitted. The amount of time may also be based on a last time an activity indicator was transmitted. The activity indicator may comprise one or more of: a signal, a reference signal, a specific cell-specific reference signal (CRS), a reference signal used for demodulation such as a DM-RS; and a reference signal used to provide channel state information such as a CSI-RS. The activity indicator may further comprise a plurality of signals, for example a combination of different ones of the mentioned reference signals or signals that are transmitted from several antenna ports, where the the transmission from each port may be seen as a signal.

Action 303. In response to determining that the activity indicator specific to the set of one or more WCDs 104-106 should be transmitted, the network node 102 transmits the activity indicator in the selected subframe and/or in one or more subframes that precede the selected subframe. The one or more subframes may be one or more subframes that immediately precede the selected subframe. The activity indicator specific to the set of one or more WCDs 104-106 may in some embodiments be transmitted only in subframes carrying data for any one of the WCDs in the set of one or more WCDs 104-106 and/or in one or more subframes preceding such a subframe, e.g. an interval of subframes before the selected subframe.

Action 304. The network node 102 further transmits the data, to the at least one of the WCDs 104 included in the set of one or more WCDs 104-106, in the selected subframe.

Action 305. The network node 102 may, in response to determining that the activity indicator specific to the set of one or more WCDs 104-106 should not be transmitted, transmit the data, to the at least one of the WCDs 104 included in the set of one or more WCDs 104-106, in the selected subframe without transmitting the activity indicator in the one or more subframes preceding the selected subframe or in the selected subframe.

Action 306. The activity indicator specific to the set of one or more WCDs may in some embodiments be a first activity indicator. The network node 102 may then select a second subframe for carrying second data to at least one WCD, e.g. the fourth WCD 107, included in a second set of one or more WCDs. Hence, the network node 102 may schedule second data for transmission to a WCD 107 included in the second set of one or more WCDs in the second subframe.

Action 307. The network node 102 may transmit a second activity indicator specific to the second set of one or more WCDs in the second subframe and/or in one or more subframes that precede the second subframe. The second activity indicator may be different from the first activity indicator.

Action 308. The network node 102 may further transmit, in the second subframe, the second data to the at least one WCD 107 included in the second set of one or more WCDs.

The network node 102 may omit scheduling data for transmission to any WCD included in the set of one or more WCDs 104-106 in the second subframe; and in response to omitting scheduling data for any WCD included in the set of one or more WCDs 104-106 in the second subframe, may refrain from transmitting the first activity indicator specific to the set of one or more WCDs 104-106 in the second subframe.

Figure 4:
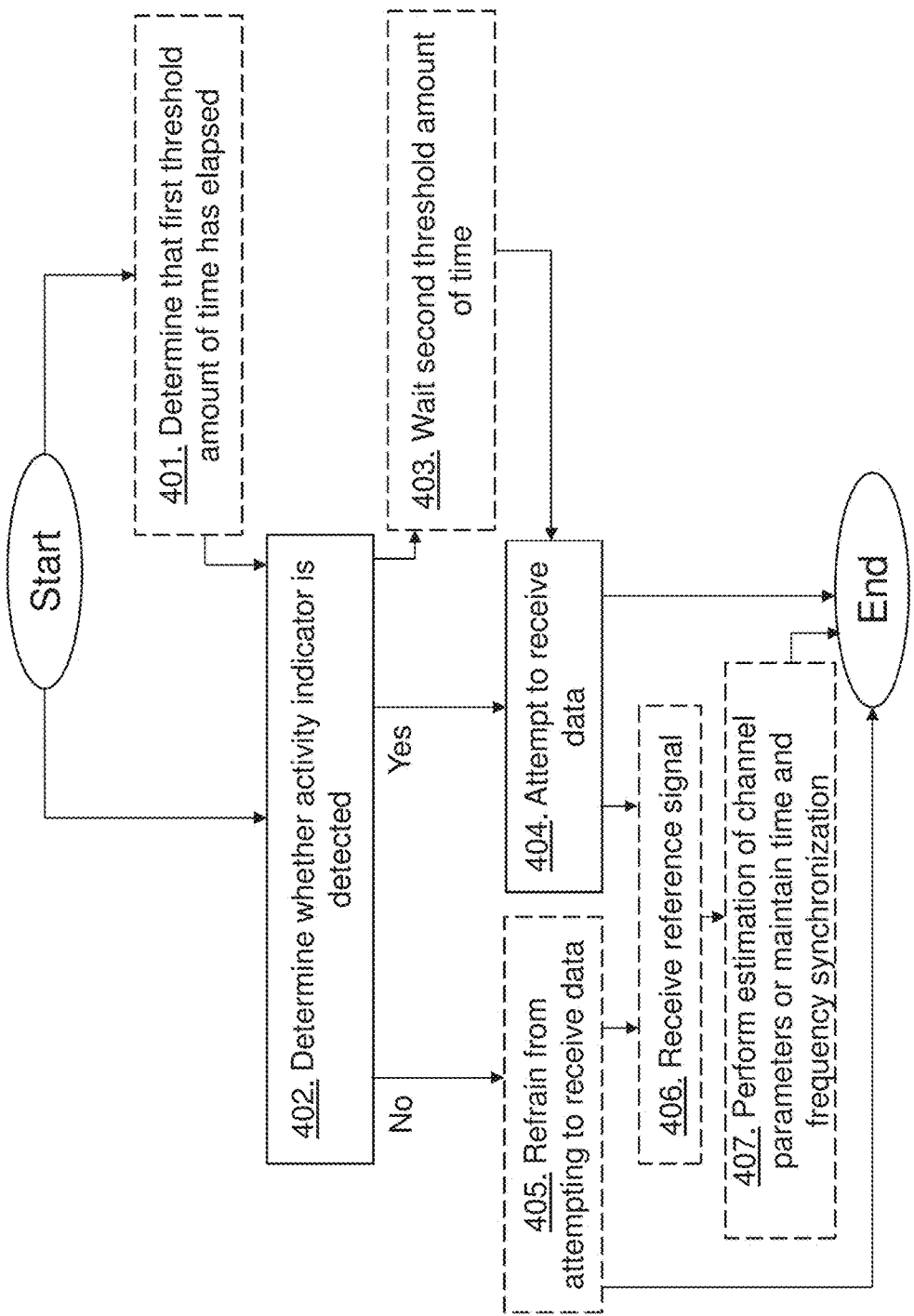
FIG. 4 illustrates a flowchart depicting a method performed by a WCD according to embodiments herein.

The method actions performed by the WCD 104, for communicating with a network node according to some embodiments will now be described with reference to a flowchart depicted in FIG. 4. The actions do not have to be taken in the order stated below, but may be taken in any suitable order. Actions performed in some, but not necessarily all embodiments are marked with dashed boxes. The WCD 104 is included in a set of one or more WCDs 104-106 being served by the network node 102.

Action 401. The WCD 104 may, before determining that the activity indicator is detected from the network node 102, determine that a first threshold amount of time has elapsed since a last time that the WCD 104 detected activity indicator. Thus, the WCD 104 may track time since a last activity indicator was received, this is because its estimate of the received signal power, time/frequency tracking and so forth gets old and may need to be renewed after a certain time period.

Action 402. The WCD 104 determines whether an activity indicator specific to the set of one or more WCDs 104-106 is detected from the network node 102 in a first subframe. The activity indicator indicates that the network node 102 has data to at least one of the WCDs 104 included in the set of one or more WCDs. The detected activity indicator may comprise one or more of: a signal; a reference signal; a specific cell-specific reference signal, CRS; a reference signal used for demodulation e.g. DM-RS; and a reference signal used for channel state information such as a CSI-RS.

Action 403. After determining that the activity indicator is detected from the network node 102, the WCD 104 may wait at least a second threshold amount of time before attempting to receive data from the network node 102. The WCD 104 may wait at least the second threshold amount of time by detecting at least a threshold amount of activity indicators before attempting to receive data from the network node 102. This is because the WCD 104 may need to receive a sufficient amount of signals in order to estimate the received signal power and the time/frequency tracking good enough before being able to receive the data.

Action 404. In response to the activity indicator being detected in the first subframe, the WCD 104 attempts to receive data from the network node 102 in one or more of: i) the first subframe and ii) a subsequent subframe that follows the first subframe.

Action 405. When the activity indicator specific to the set of one or more WCDs is not detected in the first subframe, the WCD 104 refrains from attempting to receive data in the first subframe and/or in the subsequent subframe that follows the first subframe. The subsequent subframe that follows the first subframe may be before a subframe carrying data to the WCD 104.

Action 406. When the WCD 104 detects a reference signal, being different than the activity indicator; the WCD 104 may, in response to detecting the reference signal, perform estimation of channel parameters or to maintain time and frequency synchronization using the detected reference signal independently of whether the activity indicator is determined to be detected or not.

In this section, embodiments herein will be illustrated in more detail by a number of exemplary embodiments. It should be noted that these embodiments are not mutually exclusive. Components from one embodiment may be tacitly assumed to be present in another embodiment and a person skilled in the art will readily understand how those components may be used in the other exemplary embodiments.

Transmission of Activity Indication

Figure 5:
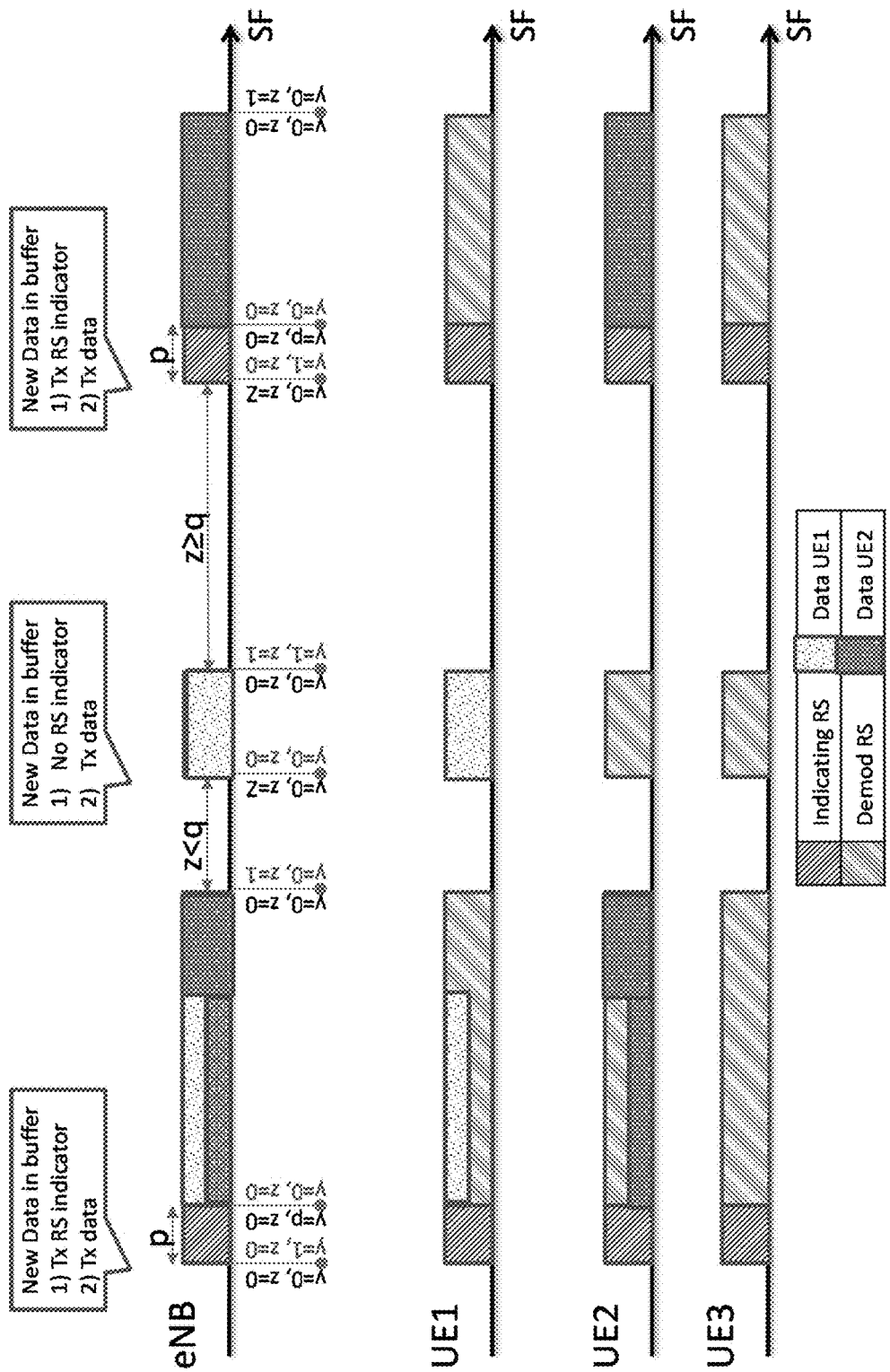
FIG. 5 shows a signalling diagram according to embodiments herein.

In one embodiment, the network node 102 determines when data being scheduled to WCDs needs to be preceded by subframes with an activity indication or indicator and when it is not necessary, see action 302. The network node 102 transmissions and the received signals from a WCD perspective are shown in FIG. 5. The procedure followed by the network node 102 for a single group of WCDs following the same activity indicator may be summarized as follows. For any subframe number, n, in which data is scheduled and transmitted to a WCD after q subframes (q>=0) without any transmissions to any WCD in the group, the network node 102 transmits a signal indicating this cell activity, i.e. that the cell is active, in subframes n-p to n, where p>=0. When the network node 102 has transmitted any reference signals representing activity indicators in any subframe among the past q subframes, the network node 102 schedules data without any activity indication transmitted in the preceding subframes. An activity indicator may be transmitted in the same subframe as the data. The parameters, p and q, are pre-defined parameters that are known to both the network node 102 and WCDs. FIG. 5 shows an example of signals transmitted by the network node 102 according to this procedure with the counters y and z keeping track of the number of subframes for which an activity indication was sent and the number of subframes with no transmissions respectively. The FIG. 5 also shows the transmissions received by the WCD from a WCD perspective. A WCD may generally receive and use reference signals in RBs in which data is not directed to it. Referring again to FIG. 3, the subframe n above may be seen to correspond to the subframe selected in action 301, the q subframes may be seen to correspond to the number of subframes spanned by the time interval mentioned in action 302 and the p subframes may be seen to correspond to the one or more subframes that precede the selected subframe, also mentioned in action 302.

In some embodiments herein, the activity indicator may be different for different groups of WCDs so that a cell may be inactive in a subframe for one group of WCDs while being active for another group of WCDs.

In some embodiments, the parameters, p, q, and s, see below, are all set to 0 so that the activity indication is always transmitted in the subframe being the subframe of interest, i.e. the subframe n mentioned above.

Transmission of RS Independent of Activity Indication

In some embodiments, the network node 102 may transmit reference symbols in any subframe regardless of the buffer status of the WCDs being served, i.e., independent of whether any connected WCD has data that needs to be transmitted to it. Such transmissions may occur with or without the transmission of any activity indicator. For example, if the CRS is being used as an activity indicator, the CSI-RS may be transmitted in a subframe without any CRS. The reference symbols are transmitted to keep the WCD synchronized and with an updated automatic gain control. Referring again to FIG. 4, the WCD may receive reference symbols transmitted by the network node 102 according to these embodiments as described in actions 406-407.

Detection of Activity Indication

Figure 6:
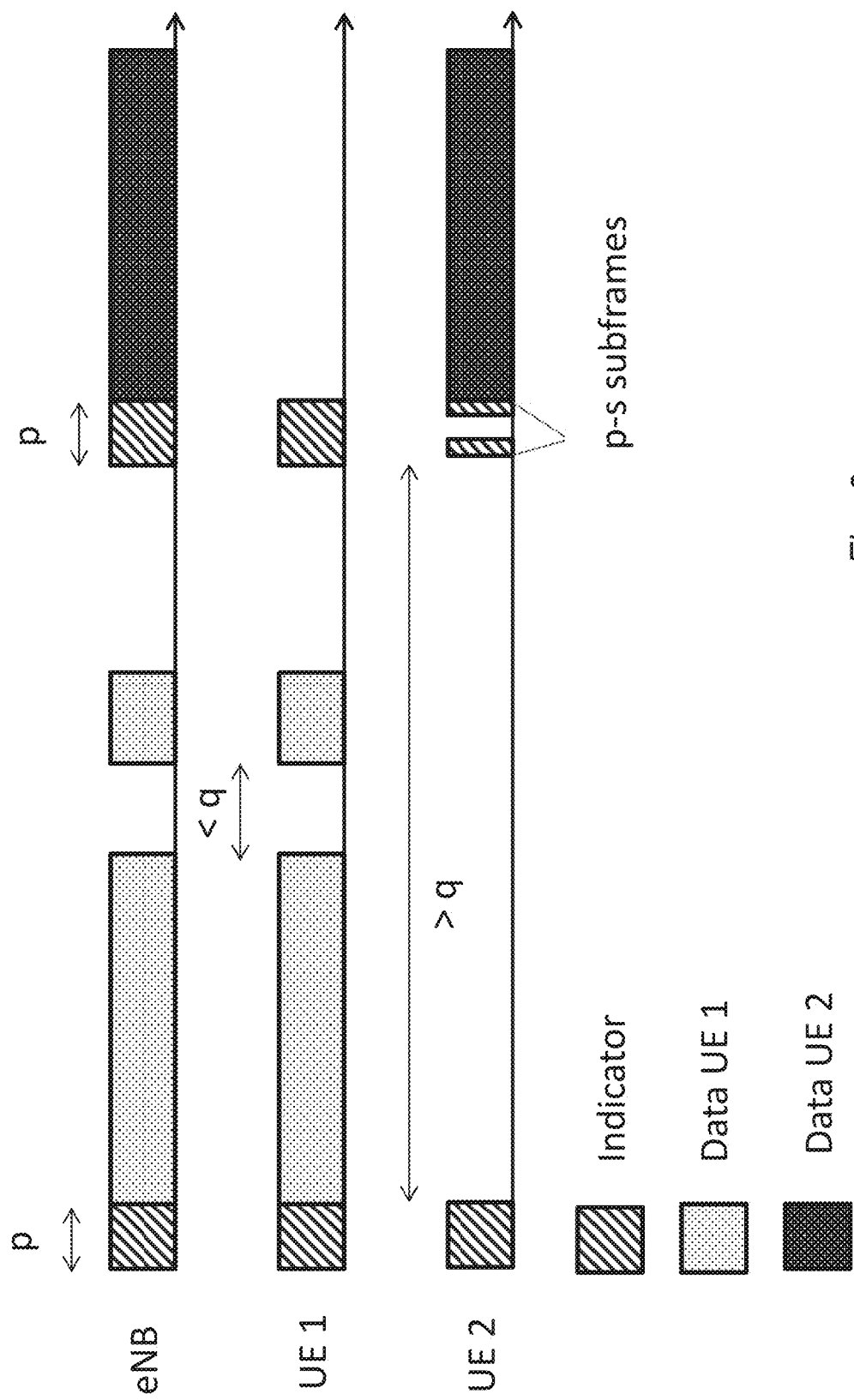
FIG. 6 shows a signalling diagram according to embodiments herein.

In some embodiments, for every subframe, excluding subframes in which the WCD 104 is scheduled to be off due to discontinuous reception (DRX) or for other reasons, every WCD performs an operation to detect an indication transmitted by the network node, see action 402. If the WCD 104 does not detect any transmissions for q or more consecutive subframes, it will receive any subsequent data transmissions only after receiving p-s subframes with an activity indicator, see action 403. This is shown in FIG. 6. The p-s (s>=0) subframes do not have to be consecutive, but if the intervals between any subframes with an activity indicator exceed q, a new set of p-s subframes must be received before receiving data. The parameters p, q and s are pre-defined parameters known to the network node 102 and to the WCD 104. Referring again to FIG. 4, the p-s subframes may be seen to correspond to a number of subframes where the WCD detects the activity indicator before having detected the threshold amount of activity indicators in action 403.

Embodiments herein may introduce the parameter s so as to provide the transmission of extra subframes for activity indication, i.e. more than needed by the WCD 104 for reception, in case the WCD 104 fails to detect the activity detector in some subframes. Thus, after a period of more than q consecutive subframes with no transmissions, the network node 102 transmits p subframes with the activity indicator before transmitting data to the WCD 104, while the WCD 104 is ready to receive data in just p-s subframes.

Use of Activity Indication

In some embodiments, see actions 406-407, the WCD 104 may use the RS detected to determine cell activity for other purposes such as time and frequency tracking, Automatic Gain Control (AGC), channel state information feedback etc. The purposes or functions for which the signal is used may depend on the original purpose or function for which the signal was designed. For example, when the DM-RSs are used for activity indication and detection, these may or may not be used also for time frequency tracking.

Reception of RS Independent of Activity Indication

In some embodiments, the WCD 104 may be configured to receive reference symbols in any subframe regardless of the reception of any activity indicator or independently of whether any data has been transmitted to it, see actions 406-407. For example, if the CRS is being used as an activity indicator, the CSI-RS may be received and used for channel state feedback in a subframe without any CRS. That is, there may be subframes configured for the WCD 104 that will always have signals that the WCD 104 can use for various purposes. The WCD 104 does not have to perform activity detection for such subframes. The reference symbols are received keeping the WCD 104 synchronized and with an updated automatic gain control.

Time/Frequency Tracking Reference Symbols as the Activity Indication

The activity indication may be performed implicitly by transmitting the same reference signal that is used for time/frequency tracking in any subframe. For LTE, this signal can be the Cell-specific Reference Signal (CRS). In this case, when the activity indicator is not detected, all other functions including time/frequency tracking, Downlink Control Information (DCI) message detection etc. are all suspended.

Demodulation Reference Symbols as the Activity Indicator

The activity indication may be performed by transmitting the same reference signal that is used for demodulation in any subframe. For LTE, this signal can be the WCD-specific RS also referred to as the DM-RS. These reference symbols only occur in the RBs where the WCD 104 may receive data. In order for the DM-RS to serve as an activity indication, in this embodiment, the WCD 104 is always configured to receive control information including scheduling assignments on the enhanced Physical Downlink Control Channel (ePDCCH) which is transmitted in pre-assigned resources that the WCD 104 is supposed to monitor for control messages. The RBs carrying ePDCCH messages include DM-RSs that the WCD 104 may use as an activity indicator.

When the WCD 104 does not detect any DM-RS in the pre-assigned RBs, it suspends any attempts at decoding a control message. When the DM-RS is detected, an attempt is made to read the control message. If a control message is successfully received, data reception commences on the RBs indicated by the control message in the subframe where the DM-RS are detected.

Channel State Information Reference Symbols as the Activity Indicator

In some embodiments, activity indication is performed by transmitting the same reference signal that is used for channel state information feedback in any subframe. For LTE, this signal can be the Channel State Information RS (CSI-RS). In LTE, each CSI process allows the CSI-RS to only appear in one out of every five subframes at most. In order to allow the WCD 104 to use the CSI-RS as an activity indicator, in one variation of this embodiment, each WCD is configured with five different CSI processes so that CSI-RS signals may be received in every subframe.

A combination of Signals as the Activity Indicator

In some embodiments, the network node 102 may use a combination of multiple signals to indicate activity to the WCD 104. For instance, the CRS and the CSI-RS may both be transmitted. In an aspect of this embodiment, the combination of signals used may be different in different subframes. For instance, cell discovery signals such as the PSS/SSS may be used together with the CRS in one subframe, a combination of the CRS and CSI-RS may be used in another subframe and only the CRS may be used in a third subframe. In this case, the WCD 104 is aware of the expected appearance of signals indicating activity based on the subframe number.

Figure 7:
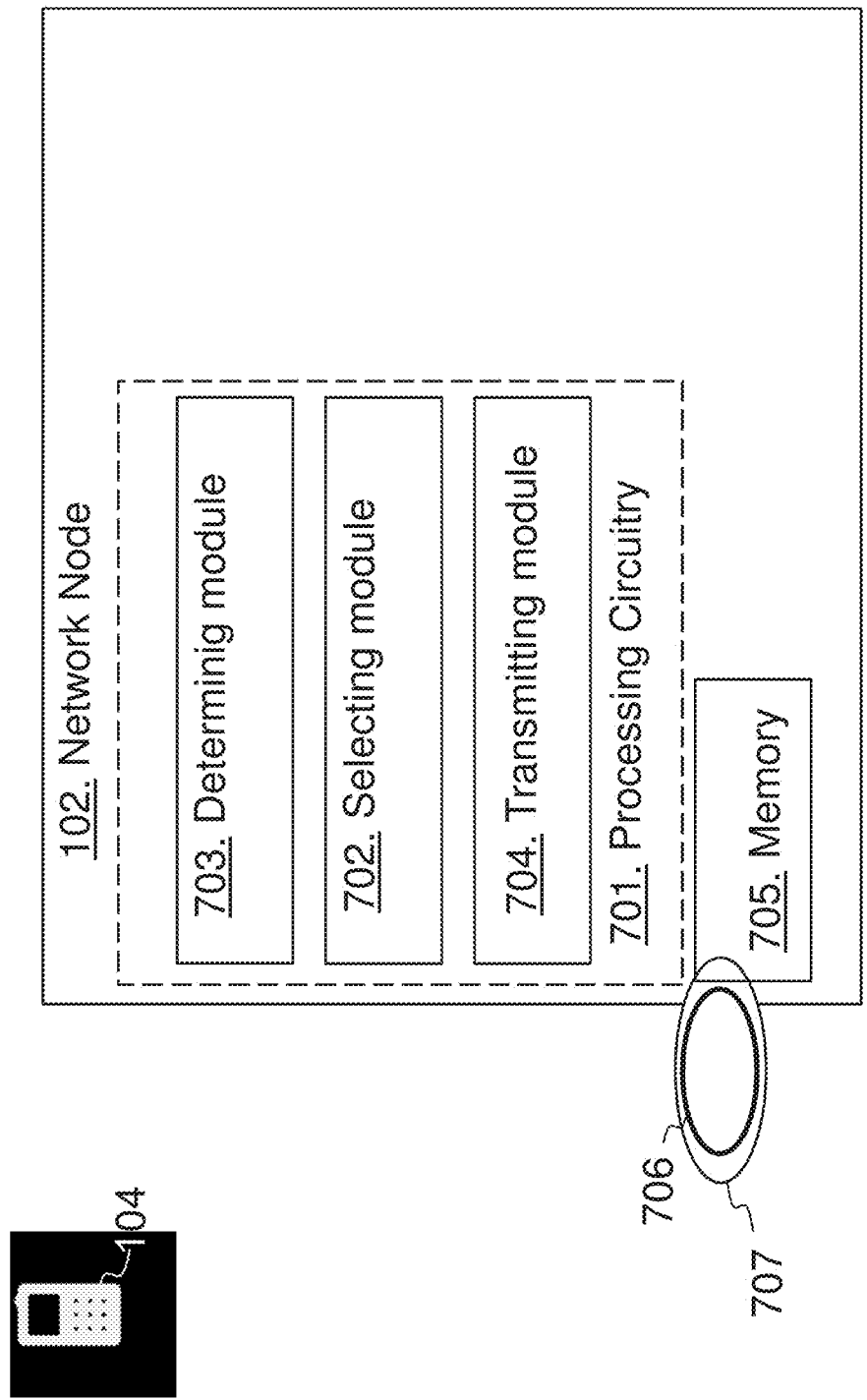
FIG. 7 illustrates a network node according to an embodiment of the present disclosure.

In order to perform the methods disclosed herein a network node 102 is provided. FIG. 7 shows a block diagram depicting a network node 102 for communicating with a set of one or more WCDs 104-106.

The network node 102 is configured to select a subframe for carrying data to at least one of the WCDs 104 included in the set of one or more WCDs 104-106. Furthermore, the network node 102 is configured to determine whether an activity indicator specific to the set of one or more WCDs should be transmitted to the set of one or more WCDs 104-106. In that case i.e. when the activity indicator specific to the set of one or more WCDs 104-106 should be transmitted to the set of one or more WCDs 104-106, the network node 102 is configured to transmit the activity indicator in the selected subframe and/or in one or more subframes that precede the selected subframe and further configured to transmit the data, to the at least one of the WCDs 104 included in the set of one or more WCDs 104-106, in the selected subframe. In response to determining that the activity indicator specific to the set of one or more WCDs 104-106 should not be transmitted, the network node 102 may be configured to transmit the data to the at least one of the WCDs 104 included in the set of one or more WCDs 104-106 in the selected subframe without transmitting the activity indicator in the one or more subframes preceding the selected subframe or in the selected subframe. The one or more subframes may be one or more subframes that immediately precede the selected subframe. The network node 102 may be configured to determine whether the activity indicator specific to the set of one or more WCDs 104-106 should be transmitted by further being configured to determine whether the transmission of data to the at least one of the WCDs is a first transmission of data to any WCD included in the set of one or more WCDs 104-106 within a time interval spanning a number of subframes including the selected subframe. The network node 102 may be configured to determine whether the transmission of data to the at least one of the WCDs 104 is the first transmission of data to any WCD included in the set of one or more WCDs 104-106 within the time interval by further being configured to determine an amount of time that has elapsed since a last time data was transmitted to any WCD included in the set of one or more WCDs 104-106. Then the network node 102 may be configured to determine whether the determined amount of time satisfies a threshold test, exceeds a time threshold, and in that case, being configured to determine that the activity indicator specific to the set of one or more WCDs 104-106 should be transmitted. The activity indicator may comprise one or more of: a signal; a reference signal; a specific cell-specific reference signal, CRS; a reference signal used for demodulation; and a reference signal used to provide channel state information. The network node 102 may in some embodiments be configured to transmit the activity indicator specific to the set of one or more WCDs 104-106 only in subframes carrying data for any one of the WCDs in the set of one or more WCDs 104-106 and/or in one or more subframes preceding such a subframe. The activity indicator specific to the set of one or more WCDs may in some embodiments be a first activity indicator. The network node 102 may then further be configured to select a second subframe for carrying second data to at least one WCD 107 included in a second set of one or more WCDs. The network node 102 may then be configured to transmit a second activity indicator specific to the second set of one or more WCDs in the second subframe and/or in one or more subframes that precede the second subframe. The second activity indicator may be different from the first activity indicator, and the network node 102 may further be configured to transmit, in the second subframe, the second data to the at least one WCD 107 included in the second set of one or more WCDs.

The network node 102 may comprise processing circuitry 701 configured to perform the methods herein. In some embodiments the network node 102 may comprise a selecting module 702. The processing circuitry 701 and/or the selecting module 702 may be configured to select a subframe for carrying data to at least one of the WCDs 104 included in the set of one or more WCDs 104-106.

The network node 102 may comprise a determining module 703. The processing circuitry 701 and/or the determining module 703 may be configured to determine whether an activity indicator specific to the set of one or more WCDs 104-106 should be transmitted to the set of one or more WCDs 104-106.

The network node 102 may comprise a transmitting module 704. The processing circuitry 701 and/or the transmitting module 704 may be configured, in the case that the activity indicator specific to the set of one or more WCDs 104-106 should be transmitted to the set of one or more WCDs 104-106, to transmit the activity indicator in the selected subframe and/or in one or more subframes that precede the selected subframe. The processing circuitry 701 and/or the transmitting module 704 may further be configured to transmit the data, to the at least one of the WCDs 104 included in the set of one or more WCDs 104-106, in the selected subframe.

The processing circuitry 701 and/or the transmitting module 704 may be configured, in response to determining that the activity indicator specific to the set of one or more WCDs 104-106 should not be transmitted, to transmit the data to the at least one of the WCDs 104 included in the set of one or more WCDs 104-106 in the selected subframe without transmitting the activity indicator in the one or more subframes preceding the selected subframe or in the selected subframe. The one or more subframes may be one or more subframes that immediately precede the selected subframe. The activity indicator specific to the set of one or more WCDs 104-106 may in some embodiments be transmitted only in subframes carrying data for any one of the WCDs in the set of one or more WCDs 104-106 and/or in one or more subframes preceding such a subframe.

The processing circuitry 701 and/or the determining module 703 may be configured to determine whether the activity indicator specific to the set of one or more WCDs 104-106 should be transmitted by further being configured to determine whether the transmission of data to the at least one of the WCDs 104 is a first transmission of data to any WCD included in the set of one or more WCDs 104-106 within a time interval spanning a number of subframes including the selected subframe. The processing circuitry 701 and/or the determining module 703 may be configured to determine whether the transmission of data to the at least one of the WCDs is the first transmission of data to any WCD included in the set of one or more WCDs 104-106 within the time interval by further being configured to determine an amount of time that has elapsed since a last time data was transmitted to any WCD included in the set of one or more WCDs 104-106. Then the processing circuitry 701 and/or the determining module 703 may be configured to determine whether the determined amount of time satisfies a threshold test, exceeds a time threshold, and in that case, being configured to determine that the activity indicator specific to the set of one or more WCDs 104-106 should be transmitted.

The activity indicator specific to the set of one or more WCDs may in some embodiments be a first activity indicator, the processing circuitry 701 and/or the selecting module 702 may then be configured to select a second subframe for carrying second data to at least one WCD 107 included in a second set of one or more WCDs. The processing circuitry 701 and/or the transmitting module 704 may then be configured to transmit a second activity indicator specific to the second set of one or more WCDs in the second subframe and/or in one or more subframes that precede the second subframe. The second activity indicator may be different from the first activity indicator, and the processing circuitry 701 and/or the transmitting module 704 may further be configured to transmit, in the second subframe, the second data to the at least one WCD 107 included in the second set of one or more WCDs.

The network node 102 may further comprise a memory 705. The memory 705 comprises one or more units to be used to store data on, such as time thresholds, activity indicators, reference signals, subframe configuration, data, buffer status, applications to perform the methods disclosed herein when being executed, and similar.

The methods according to the embodiments described herein for the network node are respectively implemented by means of e.g. a computer program 706 or a computer program product, comprising instructions, i.e., software code portions, which, when executed on at least one processor, cause the at least one processor to carry out the actions described herein, as performed by the network node 102. The computer program 706 may be stored on a computer-readable storage medium 707, e.g. a disc or similar. The computer-readable storage medium 707, having stored thereupon the computer program 706, may comprise the instructions which, when executed on at least one processor, cause the at least one processor to carry out the actions described herein, as performed by the network node 102. In some embodiments, the computer-readable storage medium 707 may be a non-transitory computer-readable storage medium.

Figure 8:
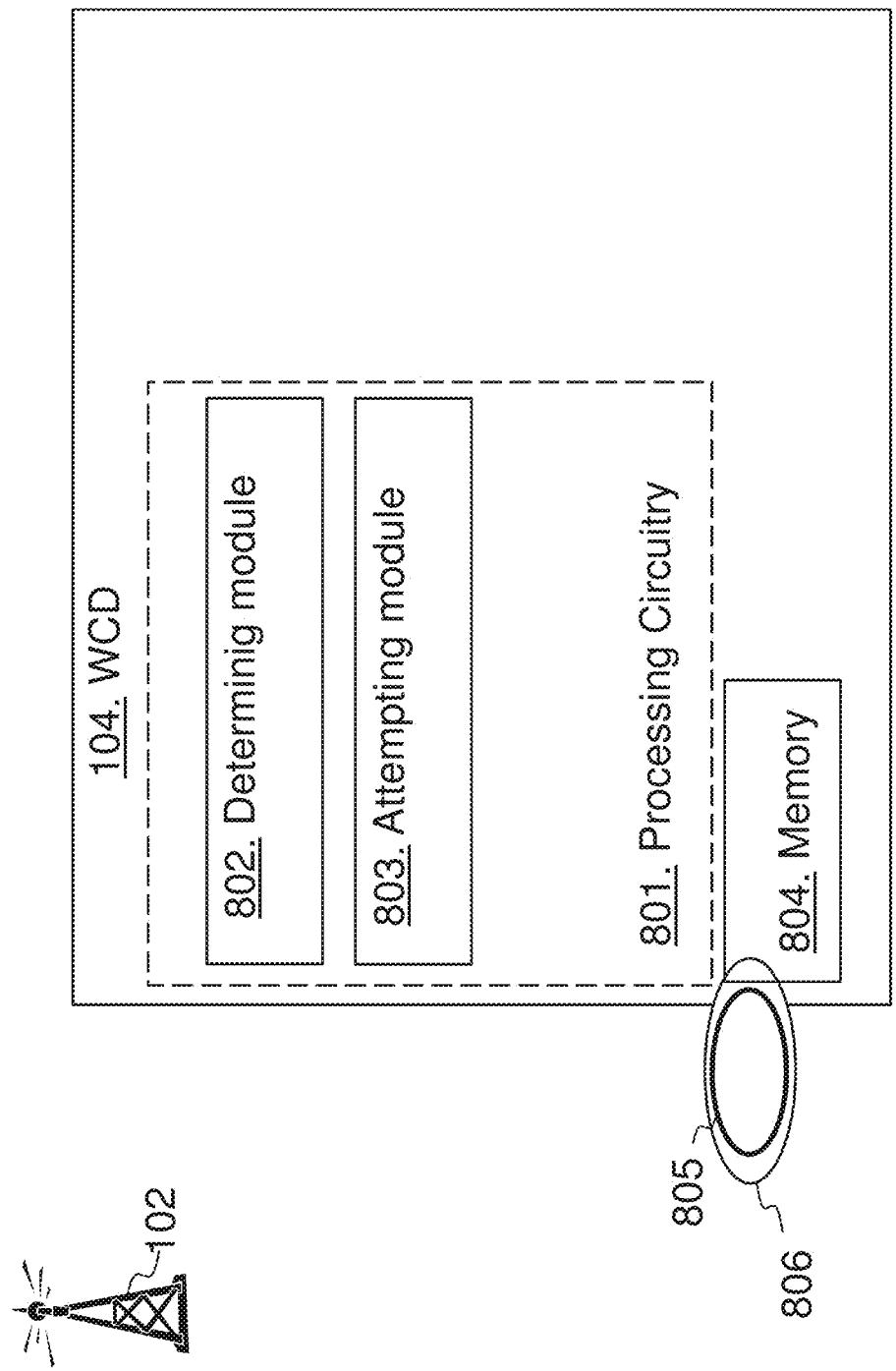
FIG. 8 illustrates a wireless communication device, WCD, according to an embodiment of the present disclosure.

In order to perform the methods disclosed herein a WCD 104 is provided. FIG. 8 shows a block diagram depicting the WCD 104 for communicating with the network node 102. The WCD 104 is included in a set of one or more WCDs 104-106 being served by the network node 102.

The WCD 104 is configured to determine whether an activity indicator specific to the set of one or more WCDs 104-106 is detected from the network node 102 in a first subframe. The activity indicator indicates that the network node 102 has data to at least one of the WCDs 104 included in the set of one or more WCDs 104-106. In response to the activity indicator being detected in the first subframe, the WCD 104 is configured to attempt to receive data from the network node 102 in one or more of: i) the first subframe and ii) a subsequent subframe that follows the first subframe.

The WCD 104 may further be configured to, when the activity indicator specific to the set of one or more WCDs 104-106 is not detected in the first subframe, refrain from attempting to receive data in the first subframe and/or in the subsequent subframe that follows the first subframe.

The WCD 104 may be configured to determine that a first threshold amount of time has elapsed since a last time that the WCD 104 detected the activity indicator before determining that the activity indicator is detected from the network node 102. In addition, the WCD 104 may further be configured to wait at least a second threshold amount of time before attempting to receive data from the network node 102 after determining that the activity indicator is detected from the network node 102.

The WCD 104 may be configured to wait at least the second threshold amount of time by being configured to detect at least a threshold amount of activity indicators before attempting to receive data from the network node 102.

The subsequent subframe that follows the first subframe may be before a subframe carrying data to the WCD 104.

As stated above the detected activity indicator may comprise one or more of: a signal; a reference signal; a specific cell-specific reference signal, CRS; a reference signal used for demodulation; and a reference signal used for channel state information.

The WCD 104 may be configured to detect a reference signal, being different than the activity indicator; and in response to detecting the reference signal, the WCD 104 may be configured to perform estimation of channel parameters or to maintain time and frequency synchronization using the detected reference signal independently of whether the activity indicator is determined to be detected or not.

The WCD 104 may comprise processing circuitry 801 configured to perform the methods herein. In some embodiments the WCD 104 may comprise a determining module 802. The processing circuitry 801 and/or the determining module 802 may be configured to determine whether an activity indicator specific to the set of one or more WCDs 104-106 is detected from the network node 102 in the first subframe. The activity indicator indicates that the network node 102 has data to at least one of the WCDs 104 included in the set of one or more WCDs 104-106.

The WCD 104 may comprise an attempting module 803. The processing circuitry 801 and/or the attempting module 803 may be configured, in response to the activity indicator being detected in the first subframe, to attempt to receive data from the network node 102 in one or more of: i) the first subframe and ii) a subsequent subframe that follows the first subframe.

The processing circuitry 801 and/or the attempting module 803 may further be configured to, when the activity indicator specific to the set of one or more WCDs 104-106 is not detected in the first subframe, refrain from attempting to receive data in the first subframe and/or in the subsequent subframe that follows the first subframe.

The processing circuitry 801 and/or the determining module 802 may be configured to determine that a first threshold amount of time has elapsed since a last time that the WCD 104 received data before determining that the activity indicator is detected from the network node 102. In addition, the processing circuitry 801 and/or the attempting module 803 may be configured to wait at least a second threshold amount of time before attempting to receive data from the network node 102 after determining that the activity indicator is detected from the network node 102. The processing circuitry 801 and/or the attempting module 803 may be configured to wait at least the second threshold amount of time by being configured to detect at least a threshold amount of activity indicators before attempting to receive data from the network node.

The subsequent subframe that follows the first subframe may be before a subframe carrying data to the WCD 104.

The processing circuitry 801 and/or the determining module 802 may be configured to detect a reference signal, being different than the activity indicator; and in response to detecting the reference signal, the processing circuitry 801 and/or the determining module 802 may be may be configured to perform estimation of channel parameters or to maintain time and frequency synchronization using the detected reference signal independently of whether the activity indicator is determined to be detected or not.

The WCD 104 may further comprise a memory 804. The memory 804 comprises one or more units to be used to store data on, such as time thresholds, activity indicators, reference signals, subframe configuration, data, applications to perform the methods disclosed herein when being executed, and similar.

The methods according to the embodiments described herein for the WCD 104 are respectively implemented by means of e.g. a computer program 805 or a computer program product, comprising instructions, i.e., software code portions, which, when executed on at least one processor, cause the at least one processor to carry out the actions described herein, as performed by the WCD 104. The computer program 805 may be stored on a computer-readable storage medium 806, e.g. a disc or similar. The computer-readable storage medium 806, having stored thereupon the computer program 805, may comprise the instructions which, when executed on at least one processor, cause the at least one processor to carry out the actions described herein, as performed by the WCD 104. In some embodiments, the computer-readable storage medium 806 may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Description of the FIGS. 9-16 illustrate different examples of methods in the network node 102, WCD 104 as well as examples of the apparatuses.

Figure 9:
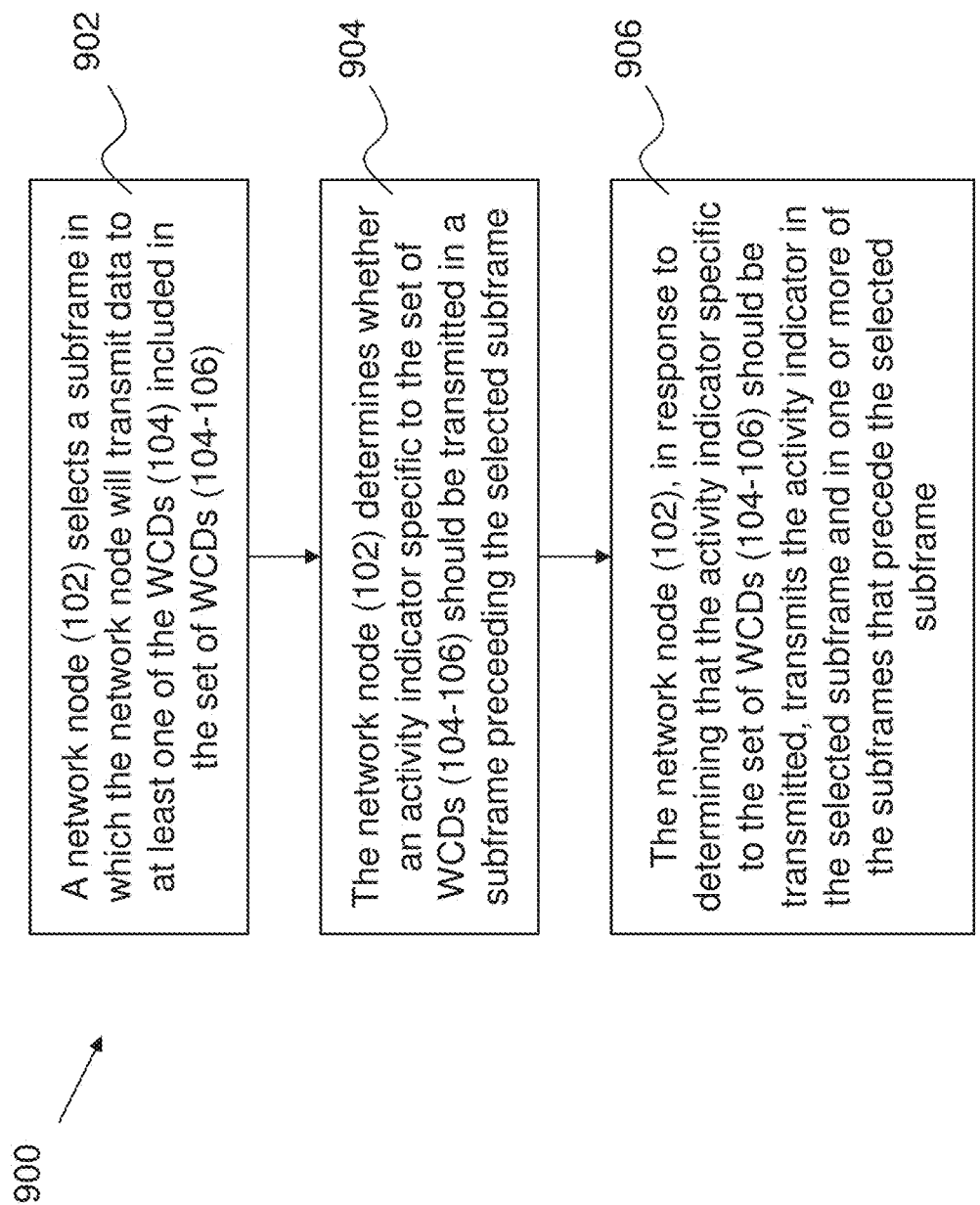
FIGS. 9-14 illustrate exemplary processes in the network node 102 and the WCD 104.

FIG. 9 is a flow diagram illustrating a process 900 for indicating activity of the network node 102 to a set of one or more WCDs, e.g., WCDs 104-106. In an embodiment, the process begins at action 902, in which the network node 102 selects a subframe in which the network node 102 will transmit data to at least one of the WCDs included in the set of WCDs.

In action 904, the network node 102 determines whether an activity indicator specific to the set of WCDs should be transmitted in a subframe preceding the selected subframe.

In action 906, the network node 102, in response to determining that the activity indicator specific to the set of WCDs should be transmitted, transmits the activity indicator in the selected subframe and in one or more of the subframes that precede the selected subframe.

Figure 10:
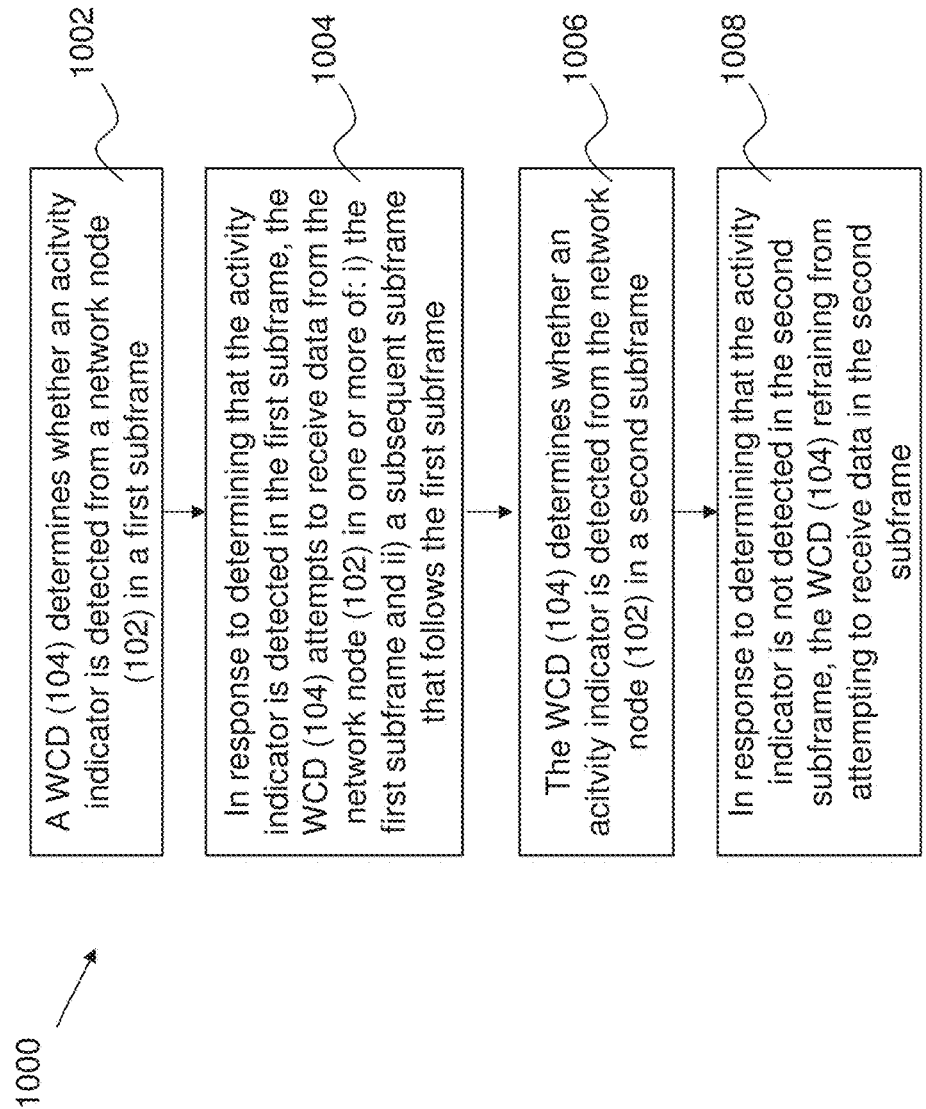

FIG. 10 is a flow diagram illustrating a process 1000 for the WCD 104 to communicate with the network node 102. In an embodiment, the process 1000 begins at action 1002, in which the WCD 104 determines whether an activity indicator is detected from the network node 102 in a first subframe.

In action 1004, in response to determining that the activity indicator is detected in the first subframe, the WCD 104 attempts to receive data from the network node 102 in one or more of: i) the first subframe and ii) a subsequent subframe that follows the first subframe.

In action 1006, the WCD 104 determines whether an activity indicator is detected from the network node 102 in a second subframe.

In action 1008, in response to determining that the activity indicator is not detected in the second subframe, the WCD 104 refrains from attempting to receive data in the second subframe.

Figure 11:
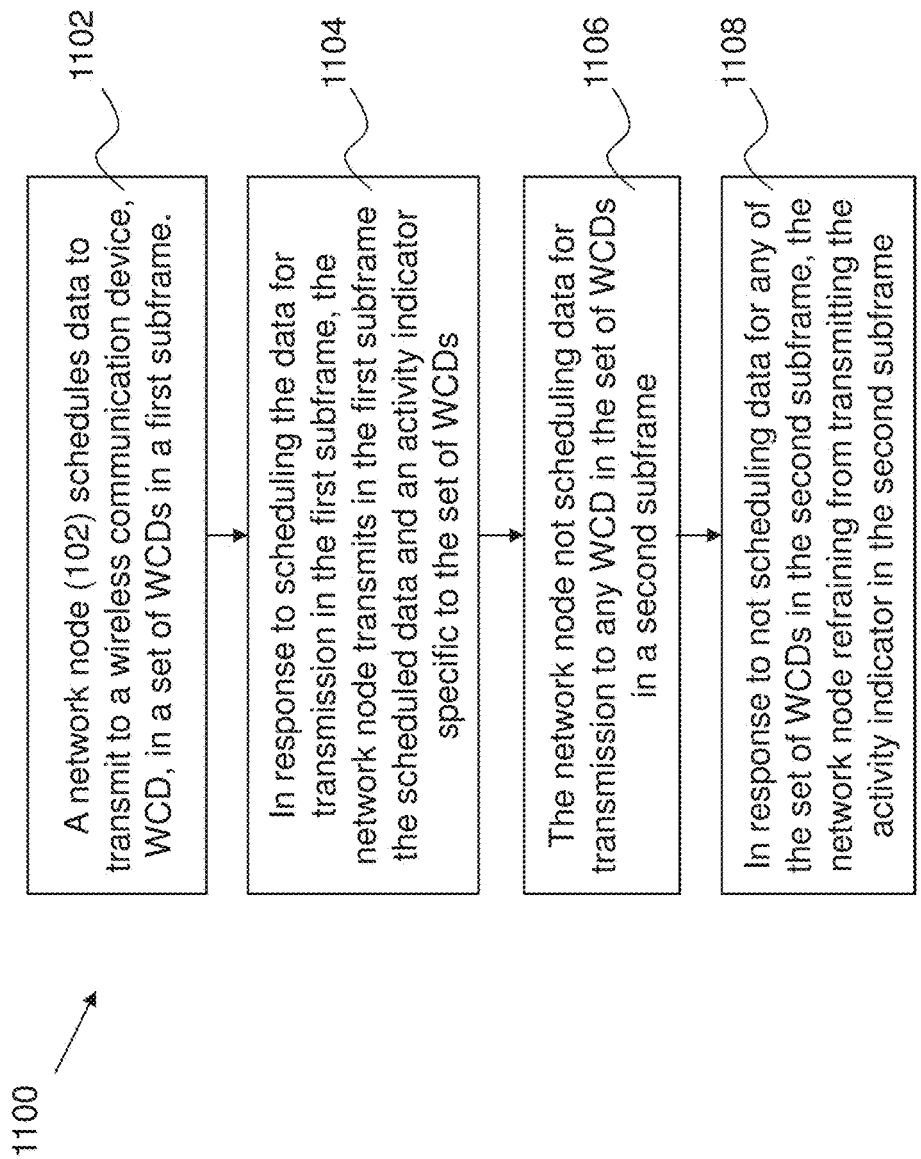

FIG. 11 is a flow diagram illustrating a process 1100 for the network node 102 to communicate with a set of WCDs. In an embodiment, the process 1100 begins at action 1102, in which the network node 102 schedules data to transmit to the WCD 104 in the set of WCDs in a first subframe.

In action 1104, in response to scheduling the data for transmission in the first subframe, the network node 102 transmits in the first subframe the scheduled data and an activity indicator specific to the set of WCDs.

In action 1106, the network node 102 does not schedule data for transmission for any WCD in the set of WCDs in a second subframe.

In action 1108, in response to not scheduling data for any of the set of WCDs in the second subframe, the network node 102 refrains from transmitting the activity indicator in the second subframe.

Figure 12:
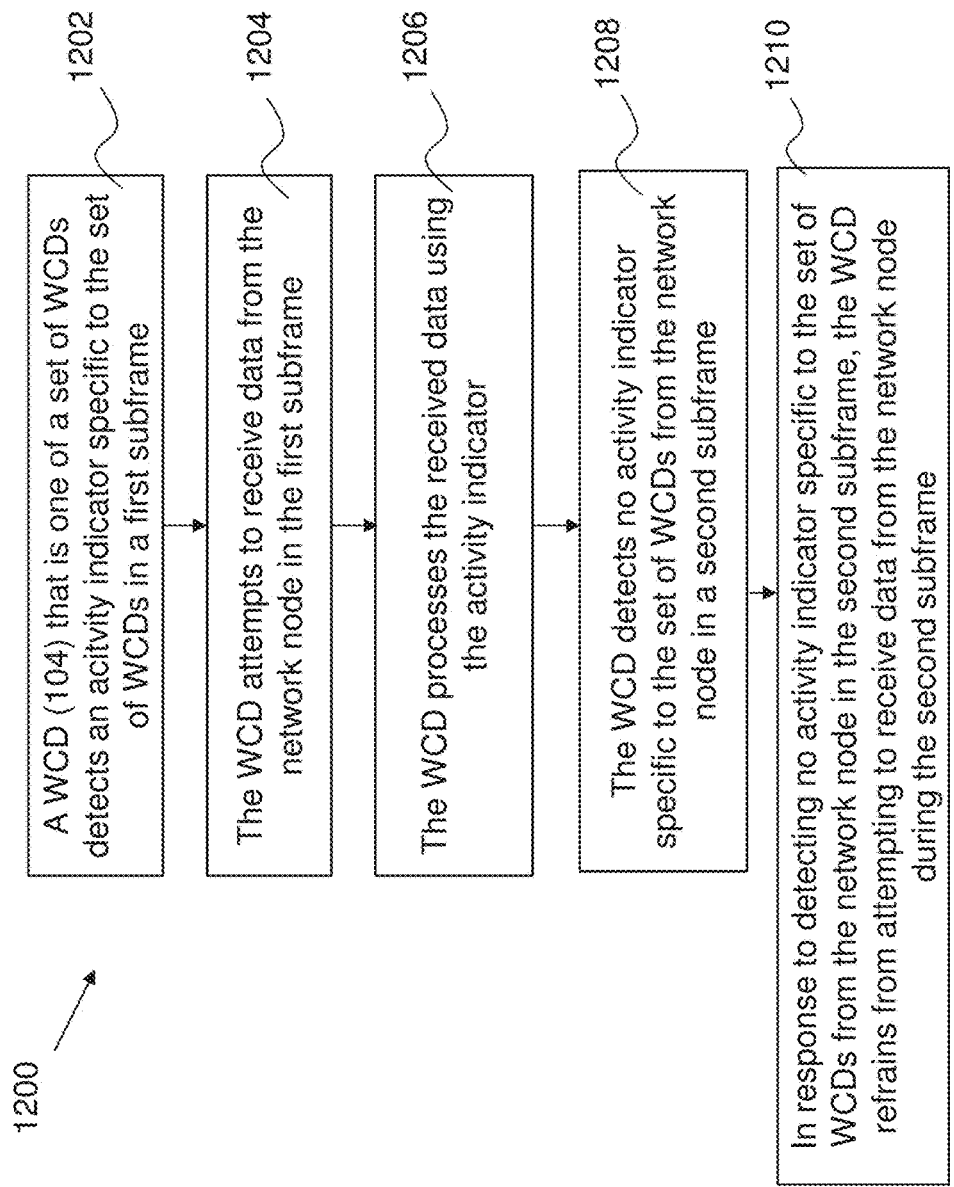

FIG. 12 is a flow diagram illustrating a process 1200 for the wireless communication device 104 to communicate with the network node 102, wherein the WCD 104 is one of a set of WCDs served by the network node 102. In an embodiment, the process 1200 begins at action 1202, in which the WCD 104 detects an activity indicator specific to the set of WCDs in a first subframe.

In action 1204, in response to detecting the activity indicator in the first subframe, the WCD 104 attempts to receive data from the network node 102 in the first subframe.

In action 1206, the WCD 104 processes the received data using the activity indicator.

In action 1208, the WCD 104 detects no activity indicator specific to the set of WCDs from the network node 102 in a second subframe.

In action 1210, in response to detecting no activity indicator specific to the set of WCDs from the network node 102 in the second subframe, the WCD 104 refrains from attempting to receive data from the network node during the second subframe.

Figure 13:
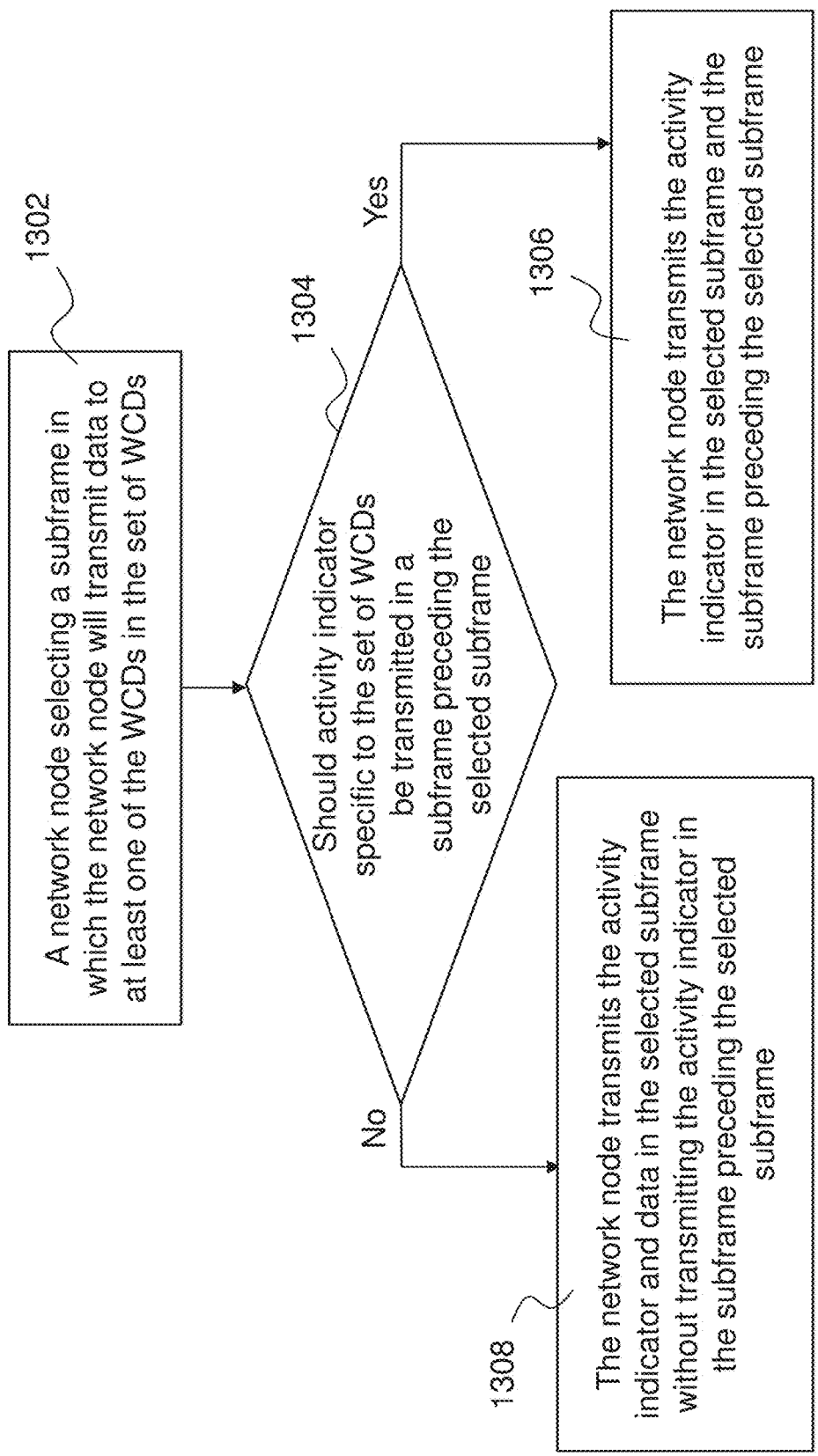
Figure 14:
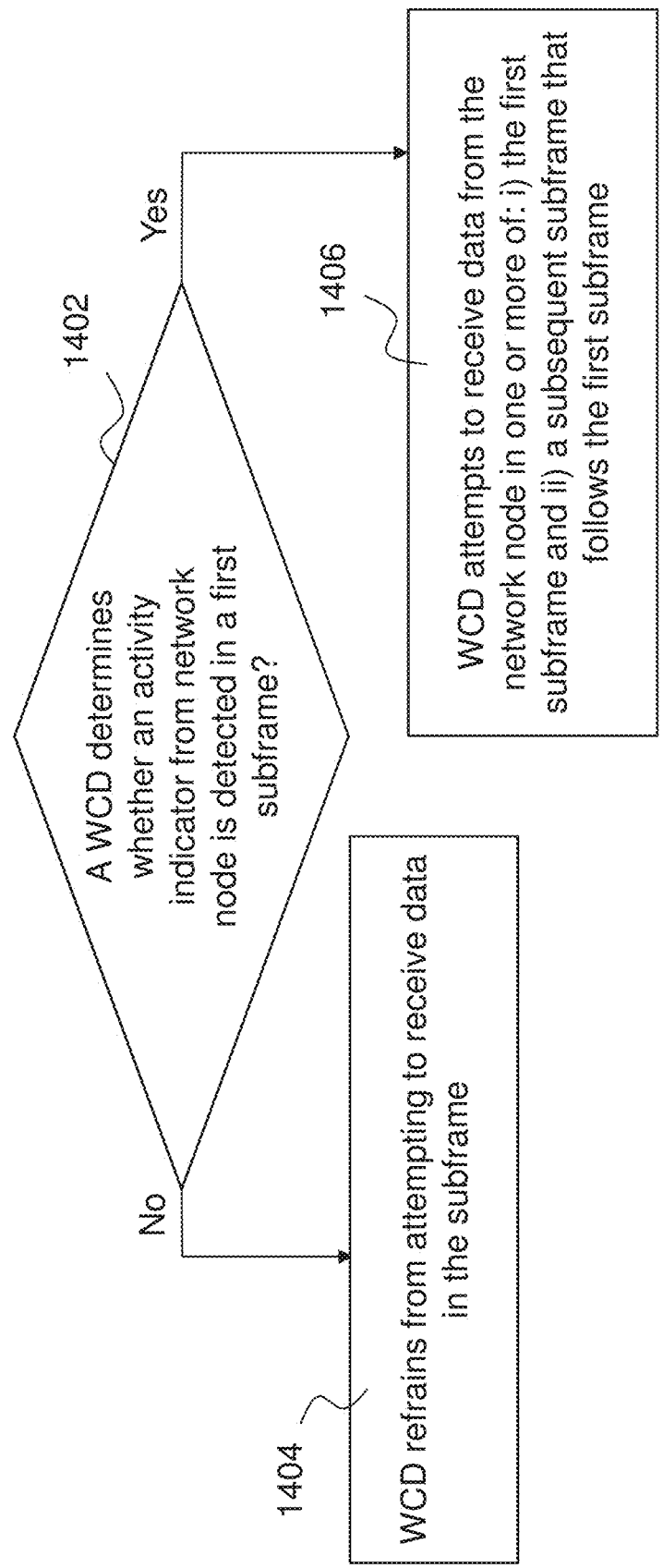

FIGS. 13 and 14 present another set of flow diagrams that illustrate example operations of the network node and WCD, respectively.

Action 1302. A network node selecting a subframe in which the network node will transmit data to at least one of the WCDs in the set of WCDs.

Action 1304. Should activity indicator specific to the set of WCDs be transmitted in a subframe preceding the selected subframe, yes or no?

Action 1306. If yes, the network node transmits the activity indicator in the selected subframe and the subframe preceding the selected subframe.

Action 1308. If no, the network node transmits the activity indicator and data in the selected subframe without transmitting the activity indicator in the subframe preceding the selected subframe.

Action 1402. A WCD determines whether an activity indicator from network node is detected in a first subframe, yes or no?

Action 1404. If no, WCD refrains from attempting to receive data in the subframe.

Action 1406. If yes, WCD attempts to receive data from the network node in one or more of: i) the first subframe and ii) a subsequent subframe that follows the first subframe.

Exemplary Network Node

Figure 15:
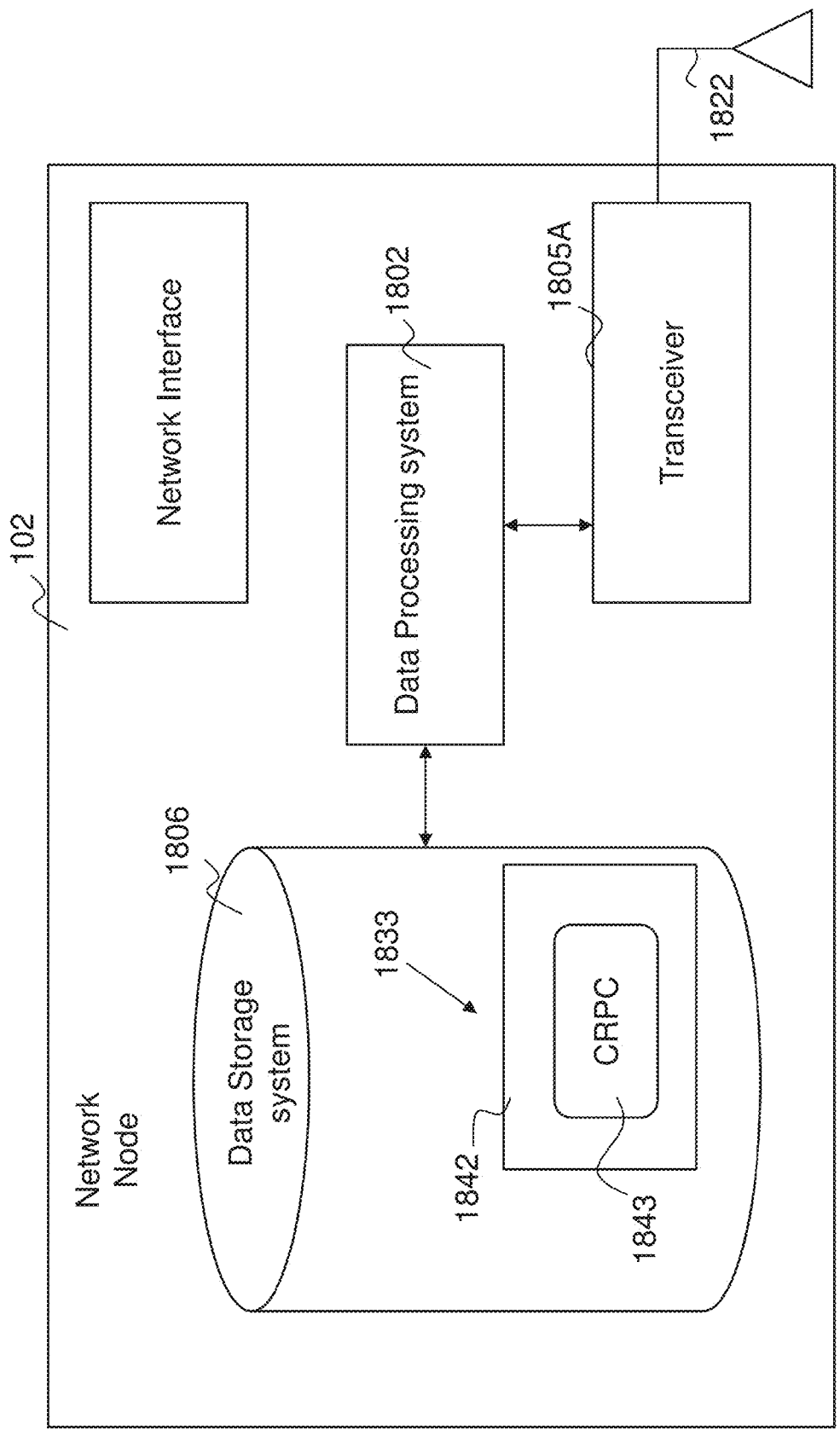
FIG. 15 illustrates a network node according to an embodiment of the present disclosure.

FIG. 15 illustrate a block diagram of a network node 102. As shown in FIG. 15, the network node 102 may include: a data processing system 1802, which may include one or more processors (e.g., microprocessors) and/or one or more circuits, such as an application specific integrated circuit (ASIC), Field-programmable gate arrays (FPGAs), etc.; a transceiver 1805A, connected to an antenna 1822, for receiving message from, and transmitting messages to, another apparatus; a data storage system 1806, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1802 includes a processor (e.g., a microprocessor), a computer program product 1833 may be provided, which computer program product includes: computer readable program code 1843 (e.g., instructions), which implements a computer program, stored on a computer readable medium 1842 of data storage system 1806, such as, but not limited, to magnetic media (e.g., a hard disk), optical media (e.g., a DVD), memory devices (e.g., random access memory), etc. In some embodiments, computer readable program code 1843 is configured such that, when executed by data processing system 1802, code 1843 causes the data processing system 1802 to perform steps described herein. In some embodiments, network node 102 may be configured to perform steps described above without the need for code 1843. For example, data processing system 1802 may consist merely of specialized hardware, such as one or more application-specific integrated circuits (ASICs). Hence, the features of the present invention described above may be implemented in hardware and/or software.

Exemplary WCD

Figure 16:
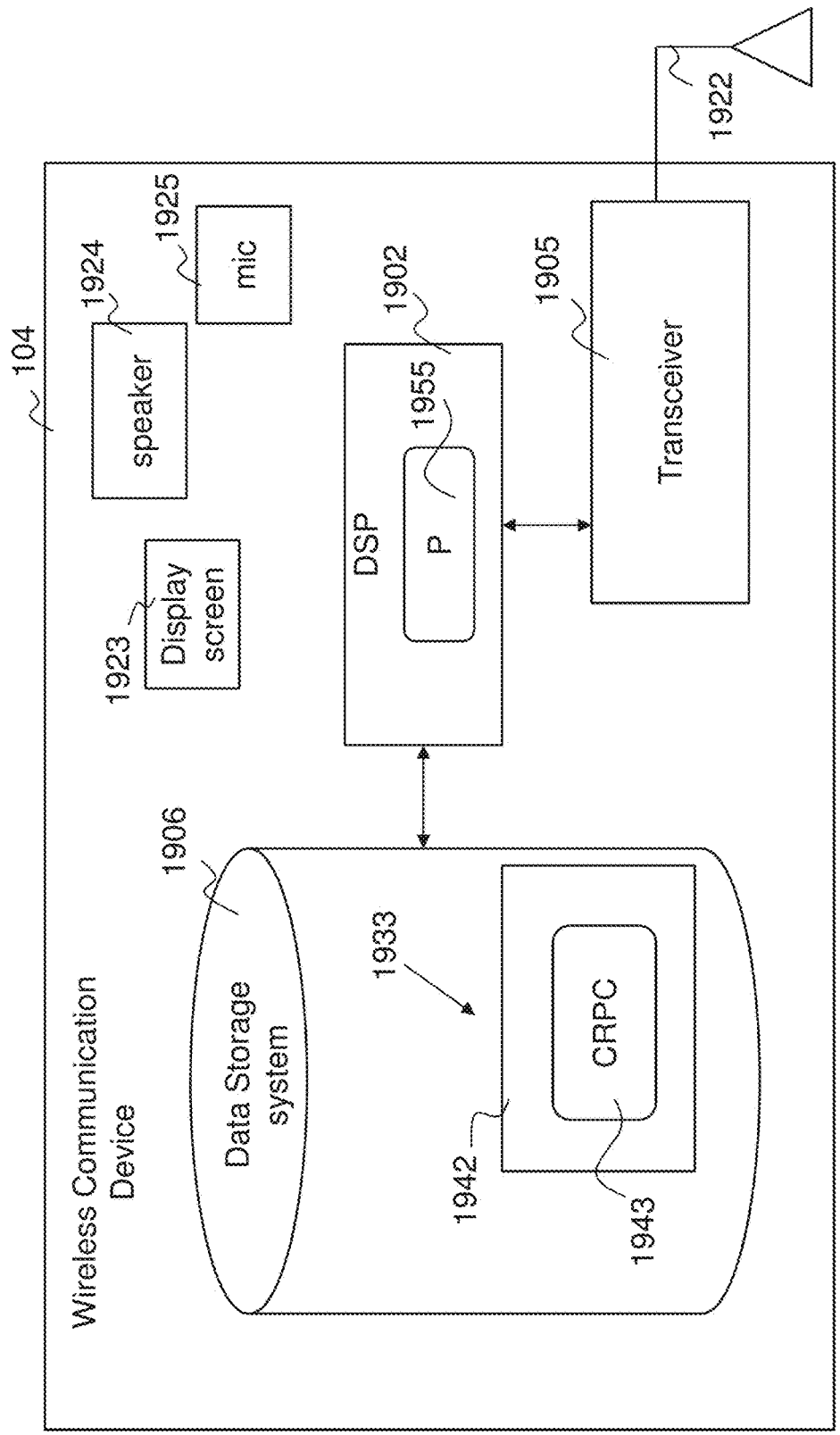
FIG. 16 illustrates a wireless communication device, WCD, according to an embodiment of the present disclosure.

FIG. 16 illustrates a block diagram of an example WCD 104. As shown in FIG. 16, WCD 104 includes: a data processing system (DPS) 1902, which may include one or more processors (P) 1955 (e.g., microprocessors) and/or one or more circuits, such as an application specific integrated circuit (ASIC), Field-programmable gate arrays (FPGAs), etc.; a transceiver 1905, connected to an antenna 1922, for receiving messages from, and transmitting messages to, various access points; a data storage system 1906, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1902 includes a processor 1955 (e.g., a microprocessor), a computer program product 1933 may be provided, which computer program product includes: computer readable program code 1943 (e.g., instructions), which implements a computer program, stored on a computer readable medium 1942 of data storage system 1906, such as, but not limited, to magnetic media (e.g., a hard disk), optical media (e.g., a DVD), memory devices (e.g., random access memory), etc. In some embodiments, computer readable program code 1943 is configured such that, when executed by data processing system 1902, code 1943 causes the data processing system 1902 to perform steps described herein.

In some embodiments, WCD 104 is configured to perform steps described above without the need for code 1943. For example, data processing system 1902 may consist merely of specialized hardware, such as one or more application-specific integrated circuits (ASICs). Hence, the features of the present invention described above may be implemented in hardware and/or software. For example, in some embodiments, the functional components of WCD 104 described above may be implemented by data processing system 1902 executing program code 1943, by data processing system 1902 operating independent of any computer program code 1943, or by any suitable combination of hardware and/or software.

In a second embodiment, WCD 104 further includes: 1) a display screen 1923 coupled to the data processing system 1902 that enables the data processing system 1902 to display information to a user of WCD 104; 2) a speaker 1924 coupled to the data processing system 1902 that enables the data processing system 1902 to output audio to the user of WCD 104; and 3) a microphone 1925 coupled to the data processing system 1902 that enables the data processing system 1902 to receive audio from the user.

In one aspect a method for indicating activity a network node to a set of one or more wireless communication devices, WCDs, 104 is described. The network node selects a subframe in which the network node will transmit data to at least one of the WCDs included in the set of WCDs 104-106. The network node determines whether an activity indicator specific to the set of WCDs should be transmitted in a subframe preceding the selected subframe. The network node, in response to determining that the activity indicator specific to the set of WCDs should be transmitted, transmits the activity indicator in the selected subframe and one or more of the subframes that precede the selected subframe.

In some instances, the one or more subframes immediately precede the selected subframe.

In some instances, the method further includes the network node selecting a second subframe in which the network node will transmit second data to at least one of the WCDs included in the set of WCDs. The node determines whether the activity indicator specific to the set of WCDs should be transmitted in a second set of one or more subframes preceding the selected second subframe. The network node, in response to determining that the activity indicator specific to the set of WCDs should not be transmitted in the second set of one or more subframes preceding the selected second subframe, transmits the activity indicator and data in the second subframe without transmitting the activity indicator in the second set of one or more subframes preceding the selected second subframe In some instances, determining whether the activity indicator specific to the set of WCDs should be transmitted comprises determining whether the transmission of data to the at least one of the WCDs is the first transmission of data to the set of WCDs within a time interval spanning a number of subframes including the selected subframe. Transmitting the activity indicator in the one or more subframes that precede the selected subframe comprises transmitting the activity indicator in one or more subframes that are in the time interval.

In some instances, determining whether the transmission of data is the first transmission of data within a time interval comprises a) determining an amount of time that has elapsed since the last time data was transmitted to any WCD included in the set of WCDs and b) determining whether the determined amount of time satisfies a threshold test. The method can further comprise determining that the activity indicator should be transmitted as a result of determining that the determined amount of time satisfies the threshold test.

In some instances, transmitting the activity indicator comprises one or more of: a) transmitting a specific cell-specific reference signal (CRS) (e.g., CRS port 0); b) transmitting a reference signal used for demodulation (e.g., DM-RS); and c) transmitting a reference signal used to provide channel state information (e.g., CSI-RS).

In one aspect a method for a wireless communication device, WCD, to communicate with a network node is described. The WCD determines whether an activity indicator is detected from a network node in a first subframe. In response to determining that the activity indicator is detected in the first subframe, the WCD attempts to receive data from the network node in one or more of: i) the first subframe and ii) a subsequent subframe that follows the first subframe. The WCD determines whether an activity indicator is detected from a network node in a second subframe. In response to determining that the activity indicator is not detected in the second subframe, the WCD refrains from attempting to receive data in the second subframe.

In some instances, the method further comprises, in response to determining that the activity indicator is not detected in the second subframe, the WCD refraining from attempting to receive data in each of a predetermined number of subframes following the second subframe.

In some instances, the WCD is one of a set of WCDs being served by the network node, and the method further comprises: a) the WCD determining whether the activity indicator is specific to the set of WCDs; b) in response to determining that the activity indicator is specific to the set of WCDs, the WCD attempting to receive data from the network node; and c) in response to determining that the activity indicator is not specific to the set of WCDs, the WCD refraining from attempting to receive data from the network node.

In some instances, the method further comprises: a) before detecting an activity indicator from the network node, the WCD determining that a first threshold amount of time has elapsed since the last time that it received an activity indicator; and b) after detecting the activity indicator from the network node, the WCD waiting at least a second threshold amount of time before attempting to receive data from the network node.

In some instances, waiting at least the second threshold amount of time comprises detecting at least a threshold amount of activity indicators before attempting to receive data from the network node.

In some instances, the network node begins transmitting data during the subsequent subframe, and the WCD begins attempting to receive data at a subframe that precedes the subsequent subframe.

In some instances, the subframe in which the WCD begins attempting to receive data precedes the subsequent subframe and follows the first subframe.

In some instances, the detected activity indicator comprises one or more of: a) a specific cell-specific reference signal (CRS) (e.g., CRS port 0); b) a reference signal used for demodulation (e.g., DM-RS); and c) a reference signal used for channel state information (CSI-RS).

In one aspect a method for a network node to communicate with a set of wireless communication devices, WCDs is described. The network node schedules data to transmit to a WCD in the set of WCDs in a first subframe. In response to scheduling the data for transmission in the first subframe, the network node transmits in the first subframe the scheduled data and an activity indicator specific to the set of WCDs. The network node does not schedule data for transmission to any WCD in the set of WCDs in a second subframe. In response to not scheduling data for any of the set of WCDs in the second subframe, the network node refrains from transmitting the activity indicator in the second sub-frame.

In some instances, the method further comprises: a) the network node scheduling data for transmission to a WCD in a second set of WCDs in the second sub-frame; and b) the network node transmitting in the second sub-frame the second data and a second activity indicator specific to the second set of WCDs, the first activity indicator being different than the second activity indicator.

In one aspect a method for a wireless communication device, WCD, to communicate with a network node, wherein the WCD is one of a set of WCDs served by the network node is described. The WCD detects an activity indicator specific to the set of WCDs in a first subframe. In response to detecting the activity indicator in the first subframe, the WCD attempts to receive data from the network node in the first subframe. The WCD processing the received data using the activity indicator. The WCD detects no activity indicator specific to the set of WCDs from the network node in a second subframe. In response to detecting no activity indicator specific to the set of WCDs from the network node in the second subframe, the WCD refrains from attempting to receive data from the network node during the second subframe.

In some instances, processing the received data comprises performing channel estimation or synchronization using the activity indicator.

In some instances, refraining from attempting to receive data from the network node during the subframe includes performing channel parameter estimation or time and frequency synchronization maintenance using the activity indicator.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a network node for enabling the network node to communicate with a set of one or more wireless communication devices (WCDs), the method comprising:
    selecting a subframe for carrying data to at least one of the WCDs included in the set of one or more WCDs;
    determining whether an activity indicator specific to the set of one or more WCDs should be transmitted to the set of one or more WCDs; and,
    in response to determining that the activity indicator specific to the set of one or more WCDs should be transmitted, transmitting the activity indicator in the selected subframe and/or in one or more subframes that precede the selected subframe, and transmitting the data, to the at least one of the WCDs included in the set of one or more WCDs, in the selected subframe, wherein
    the activity indicator specific to the set of one or more WCDs is a first activity indicator, and
    the method further comprises:
    selecting a second subframe for carrying second data to at least one WCD included in a second set of one or more WCDs; and
    transmitting a second activity indicator specific to the second set of one or more WCDs in the second subframe and/or in one or more subframes that precede the second subframe, the second activity indicator being different from the first activity indicator, and transmitting, in the second subframe, the second data to the at least one WCD included in the second set of one or more WCDs.

2. The method of claim 1, further comprising:
    in response to determining that the activity indicator specific to the set of one or more WCDs should not be transmitted, transmitting the data, to the at least one of the WCDs included in the set of one or more WCDs, in the selected subframe without transmitting the activity indicator in the one or more subframes preceding the selected subframe or in the selected subframe.

3. The method of claim 1, wherein the one or more subframes are one or more subframes that immediately precede the selected subframe.

4. The method of claim 1, wherein the determining whether the activity indicator specific to the set of one or more WCDs should be transmitted comprises determining whether the transmission of data to the at least one of the WCDs is a first transmission of data to any WCD included in the set of one or more WCDs within a time interval spanning a number of subframes including the selected subframe.

5. The method of claim 4, wherein the determining whether the transmission of data to the at least one of the WCDs is the first transmission of data to any WCD included in the set of one or more WCDs within the time interval comprises:
    determining an amount of time that has elapsed since a last time data was transmitted to any WCD included in the set of one or more WCDs; and
    determining whether the determined amount of time satisfies a threshold test, and in that case, determining that the activity indicator specific to the set of one or more WCDs should be transmitted.

6. The method of claim 1, wherein the activity indicator comprises one or more of:
    a signal;
    a reference signal;
    a specific cell-specific reference signal, CRS;
    a reference signal used for demodulation; and
    a reference signal used to provide channel state information.

7. The method of claim 1, wherein the activity indicator specific to the set of one or more WCDs is transmitted only in subframes carrying data for any one of the WCDs in the set of one or more WCDs and/or in one or more subframes preceding such a subframe.

8. A method performed by a Wireless Communication Device (WCD) for communicating with a network node, wherein the WCD is included in a set of one or more WCDs being served by the network node, the method comprising:
    determining whether an activity indicator, specific to the set of one or more WCDs, from the network node is detected in a first subframe, which activity indicator indicates that the network node has data for at least one of the WCDs included in the set of one or more WCDs;
    after determining that the activity indicator is detected in the first subframe, waiting at least a first threshold amount of time before attempting to receive data from the network node;
    after waiting at least the first threshold amount of time, attempting to receive data from the network node; and
    before detecting the activity indicator, determining that a second threshold amount of time has elapsed since a last time that the WCD detected the activity indicator, wherein the WCD waits the first threshold amount of time as a result of determining that the second threshold amount of time has elapsed.

9. The method of claim 8, further comprising:
when the activity indicator specific to the set of one or more WCDs is not detected in the first subframe, refraining from attempting to receive data in the first subframe and/or in the subsequent subframe that follows the first subframe.

10. The method of claim 8, wherein the waiting at least the second threshold amount of time comprises detecting at least a threshold amount of activity indicators before attempting to receive data from the network node.

11. The method of claim 8, wherein the subsequent subframe that follows the first subframe is before a subframe carrying data to the WCD.

12. The method of claim 8, wherein the detected activity indicator comprises one or more of:
a signal;
a reference signal;
a specific cell-specific reference signal, CRS;
a reference signal used for demodulation; and
a reference signal used for channel state information.

13. The method according to claim 8, further comprising:
detecting a reference signal, being different than the activity indicator; and
in response to detecting the reference signal, performing estimation of channel parameters or to maintain time and frequency synchronization using the detected reference signal independently of whether the activity indicator is determined to be detected or not.

14. A network node for communicating with a set of one or more wireless communication devices (WCDs), the network node comprising:
a memory; and
processing circuitry coupled to the memory, wherein the processing circuitry is configured to cause the network node to:
select a subframe for carrying data to at least one of the WCDs included in the set of one or more WCDs;
determine whether an activity indicator specific to the set of one or more WCDs should be transmitted to the set of one or more WCDs; and in that case, the network node being configured to
transmit the activity indicator in the selected subframe and/or in one or more subframes that precede the selected subframe and to transmit the data, to the at least one of the WCDs included in the set of one or more WCDs, in the selected subframe, wherein
the activity indicator specific to the set of one or more WCDs is a first activity indicator, and
the network node is further configured to:
select a second subframe for carrying second data to at least one WCD included in a second set of one or more WCDs; and
transmit a second activity indicator specific to the second set of one or more WCDs in the second subframe and/or in one or more subframes that precede the second subframe, the second activity indicator being different from the first activity indicator, and further configured to transmit, in the second subframe, the second data to the at least one WCD included in the second set of one or more WCDs.

15. The network node of claim 14, further being configured to:
in response to determining that the activity indicator specific to the set of one or more WCDs should not be transmitted, transmit the data to the at least one of the WCDs included in the set of one or more WCDs in the selected subframe without transmitting the activity indicator in the one or more subframes preceding the selected subframe or in the selected subframe.

16. The network node of claim 14, wherein the one or more subframes are one or more subframes that immediately precede the selected subframe.

17. The network node of claim 14, being configured to determine whether the activity indicator specific to the set of one or more WCDs should be transmitted by further being configured to determine whether the transmission of data to the at least one of the WCDs is a first transmission of data to any WCD included in the set of one or more WCDs within a time interval spanning a number of subframes including the selected subframe.

18. The network node of claim 17, being configured to determine whether the transmission of data to the at least one of the WCDs is the first transmission of data to any WCD included in the set of one or more WCDs within the time interval by further being configured to determine an amount of time that has elapsed since a last time data was transmitted to any WCD included in the set of one or more WCDs; and configured to determine whether the determined amount of time satisfies a threshold test, and in that case, being configured to determine that the activity indicator specific to the set of one or more WCDs should be transmitted.

19. The network node of claim 14, wherein the activity indicator comprises one or more of:
a signal;
a reference signal;
a specific cell-specific reference signal, CRS;
a reference signal used for demodulation; and
a reference signal used to provide channel state information.

20. The network node of claim 14, wherein the network node is configured to transmit the activity indicator specific to the set of one or more WCDs only in subframes carrying data for any one of the WCDs in the set of one or more WCDs and/or in one or more subframes preceding such a subframe.

21. A Wireless Communication Device (WCD) for communicating with a network node, wherein the WCD is included in a set of one or more WCDs being served by the network node, the WCD comprising:
a memory; and
processing circuitry coupled to the memory, wherein the processing circuitry is configured to cause the WCD to:
determine whether an activity indicator, specific to the set of one or more WCDs, from the network node is detected in a first subframe, which activity indicator indicates that the network node has data for at least one of the WCDs included in the set of one or more WCDs;
after determining that the activity indicator is detected in the first subframe, wait at least a first threshold amount of time before attempting to receive data from the network node; and
after waiting at least the first threshold amount of time, attempt to receive data from the network node, wherein
the processing circuitry is further configured to, before detecting the activity indicator, determine that a second threshold amount of time has elapsed since a last time that the WCD detected the activity indicator, and
the WCD waits the first threshold amount of time as a result of determining that the second threshold amount of time has elapsed.

22. The WCD of claim 21, further configured to, when the activity indicator specific to the set of one or more WCDs is not detected in the first subframe, refrain from attempting to receive data in the first subframe and/or in the subsequent subframe that follows the first subframe.

23. The WCD of claim 21, being configured to wait at least the second threshold amount of time by being configured to detect at least a threshold amount of activity indicators before attempting to receive data from the network node.

24. The WCD of claim 21, wherein the subsequent subframe that follows the first subframe is before a subframe carrying data to the WCD.

25. The WCD of claim 21, wherein the detected activity indicator comprises one or more of:
 a signal;
 a reference signal;
 a specific cell-specific reference signal, CRS;
 a reference signal used for demodulation; and
 a reference signal used for channel state information.

26. The WCD of claim 21, further configured to:
 detect a reference signal, being different than the activity indicator; and in response to detecting the reference signal, being configured to perform estimation of channel parameters or to maintain time and frequency synchronization using the detected reference signal independently of whether the activity indicator is determined to be detected or not.

* * * * *